US008519952B2

(12) United States Patent
Yee

(10) Patent No.: US 8,519,952 B2
(45) Date of Patent: *Aug. 27, 2013

(54) INPUT METHOD FOR SURFACE OF INTERACTIVE DISPLAY

(75) Inventor: Dawson Yee, Clyde Hill, WA (US)

(73) Assignee: Microsoft Corporation, Redmond, WA (US)

( * ) Notice: Subject to any disclaimer, the term of this patent is extended or adjusted under 35 U.S.C. 154(b) by 368 days.

This patent is subject to a terminal disclaimer.

(21) Appl. No.: 13/032,877

(22) Filed: Feb. 23, 2011

(65) Prior Publication Data

US 2011/0181551 A1    Jul. 28, 2011

Related U.S. Application Data

(63) Continuation of application No. 11/218,171, filed on Aug. 31, 2005, now Pat. No. 7,911,444.

(51) Int. Cl.
*G09G 5/00* (2006.01)

(52) U.S. Cl.
USPC .......................................................... 345/156

(58) Field of Classification Search
USPC ................................. 345/1.1–1.3, 156–184
See application file for complete search history.

(56) References Cited

U.S. PATENT DOCUMENTS

| | | | |
|---|---|---|---|
| 4,586,817 A | 5/1986 | Ehemann | |
| 4,896,029 A | 1/1990 | Chandler | |
| 4,972,093 A | 11/1990 | Cochran | |
| 4,992,650 A | 2/1991 | Somerville | |
| 5,109,537 A | 4/1992 | Toki | |
| 5,153,418 A | 10/1992 | Batterman | |
| 5,291,564 A | 3/1994 | Shah | |
| 5,319,214 A | 6/1994 | Gregory | |
| 5,436,639 A | 7/1995 | Arai | |
| 5,483,261 A | 1/1996 | Yasutake | |
| 5,515,452 A | 5/1996 | Penkethman | |
| 5,526,177 A | 6/1996 | Fantone | |
| 5,528,263 A | 6/1996 | Platzker | |

(Continued)

FOREIGN PATENT DOCUMENTS

| | | |
|---|---|---|
| EP | 0690407 | 1/1996 |
| EP | 1233606 | 2/2002 |

(Continued)

OTHER PUBLICATIONS

Office Action dated Nov. 9, 2011 cited in U.S. Appl. No. 10/813,855.

(Continued)

*Primary Examiner* — Rodney Amadiz
(74) *Attorney, Agent, or Firm* — Workman Nydegger

(57) ABSTRACT

An interactive display system configured for detecting an object or user input provided with an object. The system includes a display surface on which graphic images are displayed, one or more scanning light sources configured for scanning the interactive display surface, and a light detector configured for detecting light reflected from an object that is adjacent to or in contact with the interactive display surface. A computing system storing machine instructions is in communication with the scanning light source and the light detector. When executed, the machine instructions cause the computing system to illuminate the interactive display surface with the scanning light source, to detect light with the light detector that is reflected from an object after illumination with the light source, and to generate an output signal based on the detected light that has been reflected from an object on or adjacent to the interactive display surface.

20 Claims, 9 Drawing Sheets

(56) References Cited

U.S. PATENT DOCUMENTS

| | | |
|---|---|---|
| 5,541,419 A | 7/1996 | Arackellian |
| 5,684,530 A | 11/1997 | White |
| 5,821,930 A | 10/1998 | Hansen |
| 5,831,601 A | 11/1998 | Vogeley |
| 5,835,692 A | 11/1998 | Cragun |
| 5,900,863 A | 5/1999 | Numazaki |
| 5,920,688 A | 7/1999 | Cooper |
| 5,940,076 A | 8/1999 | Sommers |
| 5,973,315 A | 10/1999 | Saldana |
| 5,973,689 A | 10/1999 | Gallery |
| 6,061,091 A | 5/2000 | Van de Poel |
| 6,067,369 A | 5/2000 | Kamei |
| 6,088,019 A | 7/2000 | Rosenberg |
| 6,088,612 A | 7/2000 | Blair |
| 6,094,509 A | 7/2000 | Zheng |
| 6,111,565 A | 8/2000 | Chery |
| 6,128,003 A | 10/2000 | Smith |
| 6,154,214 A | 11/2000 | Uyehara |
| 6,181,343 B1 | 1/2001 | Lyons |
| 6,225,620 B1 | 5/2001 | Campbell |
| 6,243,492 B1 | 6/2001 | Kamei |
| 6,266,061 B1 | 7/2001 | Doi |
| 6,269,172 B1 | 7/2001 | Rehg |
| 6,323,503 B1 | 11/2001 | Hecht |
| 6,339,748 B1 | 1/2002 | Hiramatsu |
| 6,340,119 B2 | 1/2002 | He |
| 6,400,836 B2 | 6/2002 | Senior |
| 6,414,672 B2 | 7/2002 | Rekimoto et al. |
| 6,448,987 B1 | 9/2002 | Easty |
| 6,469,722 B1 | 10/2002 | Kinoe |
| 6,476,378 B2 | 11/2002 | Nougaret |
| 6,478,432 B1 | 11/2002 | Dyner |
| 6,520,648 B2 | 2/2003 | Stark |
| 6,522,395 B1 | 2/2003 | Barnji |
| 6,529,183 B1 | 3/2003 | MacLean |
| 6,545,663 B1 | 4/2003 | Arbter |
| 6,600,475 B2 | 7/2003 | Gutta |
| 6,604,682 B2 | 8/2003 | Wakamiya |
| 6,614,422 B1 | 9/2003 | Rafii |
| 6,633,338 B1 | 10/2003 | Pelsue |
| 6,636,621 B2 | 10/2003 | Thebaud |
| 6,639,594 B2 | 10/2003 | Zhang |
| 6,654,007 B2 | 11/2003 | Ito |
| 6,663,244 B1 | 12/2003 | Wichner |
| 6,690,363 B2 | 2/2004 | Newton |
| 6,710,770 B2 | 3/2004 | Tomasi |
| 6,714,221 B1 | 3/2004 | Christie |
| 6,720,949 B1 | 4/2004 | Pryor |
| 6,750,877 B2 | 6/2004 | Rosenberg |
| 6,781,069 B2 | 8/2004 | Silverstein |
| 6,788,411 B1 | 9/2004 | Lebens |
| 6,788,813 B2 | 9/2004 | Cooper |
| 6,791,530 B2 | 9/2004 | Vernier |
| 6,804,396 B2 | 10/2004 | Higaki |
| 6,812,907 B1 | 11/2004 | Gennetten |
| 6,840,627 B2 | 1/2005 | Olbrich |
| 6,888,960 B2 | 5/2005 | Penev |
| 6,895,104 B2 | 5/2005 | Wendt |
| 6,956,963 B2 | 10/2005 | Ulrich |
| 6,959,102 B2 | 10/2005 | Peck |
| 6,975,360 B2 | 12/2005 | Slatter |
| 7,006,128 B2 | 2/2006 | Xie |
| 7,007,236 B2 | 2/2006 | Dempski |
| 7,058,217 B2 | 6/2006 | Thomber |
| 7,075,687 B2 | 7/2006 | Lippert |
| 7,079,238 B2 | 7/2006 | Vaez-Iravani |
| 7,084,859 B1 | 8/2006 | Pryor |
| 7,095,401 B2 | 8/2006 | Liu |
| 7,119,897 B2 | 10/2006 | Vaez-Iravani |
| 7,120,280 B2 | 10/2006 | Biswas |
| 7,136,537 B2 | 11/2006 | Pilu |
| 7,144,117 B2 | 12/2006 | Kojima |
| 7,161,578 B1 | 1/2007 | Schneider |
| 7,168,813 B2 | 1/2007 | Wong |
| 7,204,428 B2 | 4/2007 | Wilson |
| 7,268,774 B2 | 9/2007 | Pittel |
| 7,281,661 B2 | 10/2007 | Zhu |
| 7,310,085 B2 | 12/2007 | Holloway |
| 7,327,376 B2 | 2/2008 | Shen |
| 7,342,574 B1 | 3/2008 | Fujioka |
| 7,372,977 B2 | 5/2008 | Fujimura |
| 7,375,810 B2 | 5/2008 | Nikoonahad |
| 7,379,562 B2 | 5/2008 | Wilson |
| 7,391,507 B2 | 6/2008 | Chism |
| 7,394,459 B2 | 7/2008 | Bathiche |
| 7,397,464 B1 | 7/2008 | Robbins |
| 7,398,927 B2 | 7/2008 | Olmstead |
| 7,404,146 B2 | 7/2008 | Bennetts |
| 7,418,671 B2 | 8/2008 | Hama |
| 7,467,380 B2 | 12/2008 | Kurlander |
| 7,492,357 B2 | 2/2009 | Morrison |
| 7,499,027 B2 | 3/2009 | Brigham |
| 7,519,223 B2 | 4/2009 | Dehlin |
| 7,525,538 B2 | 4/2009 | Bathiche |
| 7,576,725 B2 | 8/2009 | Bathiche |
| 7,593,593 B2 | 9/2009 | Wilson |
| 7,630,002 B2 | 12/2009 | Jenkins |
| 7,665,041 B2 | 2/2010 | Wilson et al. |
| 7,701,437 B2 | 4/2010 | Thursfield |
| 7,724,242 B2 | 5/2010 | Hillis |
| 7,728,821 B2 | 6/2010 | Hillis |
| 2001/0012001 A1 | 8/2001 | Rekimoto |
| 2001/0036299 A1 | 11/2001 | Senior |
| 2001/0055006 A1 | 12/2001 | Sano |
| 2002/0006786 A1 | 1/2002 | Mine |
| 2002/0041700 A1 | 4/2002 | Therbaud |
| 2002/0113882 A1 | 8/2002 | Pollard |
| 2002/0125411 A1 | 9/2002 | Christy |
| 2002/0181774 A1 | 12/2002 | Ishikura |
| 2002/0186221 A1 | 12/2002 | Bell |
| 2003/0156756 A1 | 8/2003 | Gorturk |
| 2003/0161524 A1 | 8/2003 | King |
| 2004/0001113 A1 | 1/2004 | Zipperer |
| 2004/0005920 A1 | 1/2004 | Soltys |
| 2004/0090524 A1 | 5/2004 | Belliveau |
| 2004/0155902 A1 | 8/2004 | Dempski |
| 2004/0196371 A1 | 10/2004 | Kono |
| 2005/0050476 A1 | 3/2005 | SanGiovanni |
| 2005/0064936 A1 | 3/2005 | Pryor |
| 2005/0110964 A1 | 5/2005 | Bell |
| 2005/0122308 A1 | 6/2005 | Bell |
| 2005/0134853 A1 | 6/2005 | Ingleson |
| 2005/0151850 A1 | 7/2005 | Ahn |
| 2005/0162381 A1 | 7/2005 | Bell |
| 2005/0212753 A1 | 9/2005 | Marvit |
| 2005/0226467 A1 | 10/2005 | Hatano |
| 2005/0227217 A1 | 10/2005 | Wilson |
| 2005/0238201 A1 | 10/2005 | Shamaie |
| 2005/0245302 A1 | 11/2005 | Bathiche |
| 2005/0255434 A1 | 11/2005 | Lok |
| 2005/0277071 A1 | 12/2005 | Yee |
| 2006/0033835 A1 | 2/2006 | Pollard |
| 2006/0034492 A1 | 2/2006 | Siegel |
| 2006/0036944 A1 | 2/2006 | Wilson |
| 2006/0043194 A1 | 3/2006 | Barkan |
| 2006/0056662 A1 | 3/2006 | Thieme |
| 2006/0092267 A1 | 5/2006 | Dempski |
| 2006/0152741 A1 | 7/2006 | Quist |
| 2006/0163355 A1 | 7/2006 | Olmstead |
| 2006/0178212 A1 | 8/2006 | Penzias |
| 2006/0202974 A1 | 9/2006 | Thielman |
| 2007/0046625 A1 | 3/2007 | Yee |
| 2007/0063981 A1 | 3/2007 | Galyean |
| 2007/0075163 A1 | 4/2007 | Wilson et al. |
| 2007/0126717 A1 | 6/2007 | Cohen |
| 2007/0157095 A1 | 7/2007 | Bilow |
| 2007/0200970 A1 | 8/2007 | Keam |
| 2007/0279494 A1 | 12/2007 | Aman |
| 2008/0036732 A1 | 2/2008 | Wilson et al. |
| 2008/0122786 A1 | 5/2008 | Pryor |
| 2008/0180530 A1 | 7/2008 | Keam |
| 2008/0193043 A1 | 8/2008 | Wilson |
| 2008/0231611 A1 | 9/2008 | Bathiche |

| | | | |
|---|---|---|---|
| 2009/0121894 | A1 | 5/2009 | Wilson et al. |
| 2009/0262070 | A1 | 10/2009 | Wilson |
| 2012/0169673 | A1 | 7/2012 | Wilson |

FOREIGN PATENT DOCUMENTS

| | | |
|---|---|---|
| FR | 2756077 | 5/1998 |
| JP | H10-177449 | 6/1998 |
| JP | H11-224160 | 8/1999 |
| JP | 2004-259247 | 9/2004 |
| JP | 2004-319364 | 11/2004 |
| JP | 2006-031941 | 2/2006 |
| JP | 2007-514242 | 5/2007 |
| KR | 102001005203 | 1/2001 |
| KR | 1020040072652 | 8/2004 |
| KR | 1020050051554 | 6/2005 |
| WO | WO 91/18383 | 11/1991 |
| WO | WO 97-14075 | 4/1997 |
| WO | WO 98/19292 | 5/1998 |
| WO | WO 01/84251 | 11/2001 |
| WO | WO 2005-057399 | 6/2005 |

OTHER PUBLICATIONS

U.S. Appl. No. 10/813,855, May 6, 2011, Office Action.
U.S. Appl. No. 12/492,178, May 26, 2011, Office Action.
"3.6 Interpolation in Two or More Dimensions," Numerical Recipes in C: The Art of Scientific Computing. Chapter 3. Interpolation and Extrapolation. © 1988-1992, Cambridge University Press. Numberical Recipes Software. pp. 123-128.
"Bar Code 1,2-Dimensional Bar Code Page." Available http://www.adams1.com/pub/russadam/stack.html. Printed Jan. 20, 2004. 14pp.
Ambiente article. "InteracTable®." Dated Jul. 7, 2000. Available http://wwww.darmstadt.gmd.de/ambiente/activities/interactable.html. Printed Nov. 21, 2003 3pp.
Bier, Stone, Pier, Buston, and DeRose. "Toolglass and Magic Lenses: The See-Through Interface." *Proceedings of Siggraph '93* (Anaheim, August). *Computer Graphics Annual Conference Series*, ACM, 1993, pp. 73-80. 8pp.
Blickenstorfer, Conrad H. "First Look: Acer TravelMate TM100 with Windows XP Tablet PC Edition." Pen Computing Magazine. Jul. 2002. pp. 47-47.
"DiamondSpin—Begs for Direct Manipulation Technology Is it in the Pen? Sony Leaps Out-of-the-Box Again Pen with Gummi." Mitsubishi/DiamondSpin. CHI 2004#3. Printed Apr. 30, 2004. 5pp.
Dietz and Leigh, "DiamondTouch: A Multi=User Touch Technology." *UIST '01* orlando FLA. © ACM 2001 1-58113-438-x/01/11. CHI Letters 3 (2). Nov. 11-14, 2001. pp. 219-226.
Electronic Check Alliance Processing, Inc. "Gift Cards, How Stored Value Card Systems Work." Available. http:www.electron-cap.com/GiftCards.htm. Printed Jan. 20, 2004 and May 16, 2004. © 2003. 2pp. Total (3pp printed).
Fukuchi and Rekimoto. Interaction Tehcniques for SmartSkin.: *ACM UIST2002 demonstration*, 2002. 2pp.
Grabowski, Robert. "A Miniature Video Laser Range Finder for Small Robots." Available http://www.andrew.cmu.edu/~rig/research_hardware/laser_rangefinder.html. Printed May 16, 2004. 8pp.
Grant and Winograd. "Flexible, Collaborative Organization on a Tabletop." ACM CSCW 2002: Workshop on Co-located Tabletop Collaboration: Technologies and Directios. New Orleans, LA. Nov. 2002. pp. 1-4.
Horn, Berthold K.P. "Robot Vision." The MIT Press. Available http://mitpress.mit.edu/catalog/item/default.asp?ttype=2&tid=8388. Printed Dec. 17, 2003. 6pp. Total.
Horn, Berthold Klaus Paul. "Robot Vision." Binary Images: Topological Properties. The MIT Electrical Engineering and Computer Sciene Seriese. 1986. pp. 66-71 an cover pages(s).
Hunter, Anderw. "Connected Components Analysis (Computer Vision)." ww.google.com search results http://www.google.com/search?sourceid=navclient&q=connected+component+ellipse. Printed Mar. 7, 2004. Article dated Sep. 24, 2002. 2pp search results, 21pp article.
IR Distance Sensor.: Available http://www.diyelectronics.com/Accessories/IRDS.html (2pp) and http://www.diyelectronics.com/Accessories/GP2D05.html (1pg.). Printed Dec. 30, 2003. 3pp.

"Tangible Bits: Towards Seamless Interfaces between People, Bits and Atoms." *Proceedings of CHI '97*, Mar. 22-27, 1997, Atlanta, Georgia © 1997 ACM 0-89791-802-9/97/03. pp. 1-8.
Ishii, Wisneski, Orbanes, Chun, and Paradiso. "PingPongPlus: Design of an Athletic-Tangible Interface for Computer-Supported Cooperative Play." *Proceedings of CHI '99*, May 15-20, 1999, © 1999 ACM. pp. 1-8.
Johanson, Kolodny, and Russell. "A Hand pose and Position Tracker for the Interactive Table." CS223B Final Project. Available http://graphics.stanford.edu/~drussel/vision/tracker-report.html. Printed Dec. 16, 2003, 6pp.
Ju, Hurwitz, Judd, and Lee. "CounterActive: An Interactive Cookbook for the Kitchen Counter." *Extended Abstracts of CHI 2001*, Seattle. Apr. 2001 pp. 269-270.
Kang, Sing Bing. "Radial Distortion Snakes." *IAPR Workshop on Machine Vision Applications (MVA2000)*, Tokyo, Japan. Nov. 2000. pp. 603-606.
Kato Billinghurst, Poupyrev, Imamoto, and Tachibana. "Virtual Object Manipulation on a Table-Top AR Environment." *IEEE and ACM Int'l Symposium on Augmented Reality 2000, ISAR '2000*, Oct. 5-6, 2000, Munich 9pp.
Klemmer, Newman, and Sapien. "The Designer's Outpost: A Task-Centered Tangible Interface for Web Site Information Design." *Proceedings of Human Factors in Computing Systems: CHI 2000 Extended Abstracts*. The Hague, The Netherlands. Apr. 1-6, 2000. pp. 333-334.
Klemmer, Newman, Farrell, Bilezikjian, and Landay. "The Designers' Outpost: A Tangible Interface for Collaborative Web Site Design." *CHI Letters, The 14th Annual ACM Symposium on User Interface Soft Technology: UIST 2001*. 3(2). pp. 1-10.
Kobayashi, Hirano, Narita, and Ishi. "A Tangible Interface for IP Network Simulation." *CHI 2003*, Apr. 5-10, 2003, F. Lauderdale, FL ACM 1-58113-630--7/03/0004. 2pp.
Koike, Sato, and Kobayashi. "Integrating Paper and Digital Information on EnhanceDesk: A Method for Reltime Finger Tracking on an Augmented Desk System." ACM Transaction on Computer-Human Interaction, vol. 8 No. 4, Dec. 2001. © 2001 ACM 1073-0516/01/1200-0307. pp. 307-322.
Leibe, Starner, Ribarsky, Wartell, Krum, Singletary, and Hodges. "The Perceptive workbench: Toward Spontaneous and Natural Interaction In Semi-Immersive Virtual Environments." Proceedings of the IEEE Virtual Relaity 2000 Conference, Mar. 18-22, 2000. New Brunswich, New Jersey: IEEE Computer Society, 2000. 8pp.
Leigh and Dietz "DiamondTouch Characteristics and Capabilities." Mitsubishi Electric Research Laboratories, Cambridge, Massachusetts, USA. Undated. 2pp., 2002.
Magerkurth, Stenzel, and Prante. "STARS—A Ubiquitous Computing Platform fo rComputer Augmented Tabletop Games." 5th International Conference on Ubiquitous Computing (Ubicomp '03), Oct. 12-15, 2003, Seattle, Washington. 2 pp.
Malandain, Gregoire. "Connected Components Extraction." Available http://www-sop.inria.fr/epidaure/personnel/malandai/segment/connese.html. Printed Dec. 18, 2003. 3pp.
Matsushita and Rekimoto. "HoloWall; Designing a Finger, Hand, Body, and Object Sensitive Wall." UIST '97 Banff, Alberta, Canada. © 1997 ACM 0-89791-881-9/97/10. pp. 209-210.
Missouri Department of Revenue. "2D Barcode Technology." Undated. 3pp.
Moran, Saund, van Melle, Gujar, Fishkin, and Harrison. "Design and Technology for Collaborage; Collaborative Collages of Information on Physical Walls." UIST '99. Asheville, NC. © 1999 ACM 1-58113-075-9/99/11, CHI Letters vol. 1, 1. pp. 197-206.
Pangaro, Maynes-Aminzade, and Ishii. "The Actuated Workbench: Computer-Controlled Actuation in Tabletop Tangible Interfaces." Proceedings of UIST 2002, Oct. 27-30, 2002. © 2002 ACM. 10pp.
Paradiso, Hsiao, Strickon, Lifton, and Adler. "Sensor systems for interactive surfaces." IBM Systems Journal, vol. 39, Nos. 3&4, 2000. pp. 892-914.
Patten, Ishii, Hines, and Pangaro. "Sensetable: A Wireless Object Tracking Platform for Tangible User Interfaces." Proceedings of CHI 2001, Mar. 31-Apr. 5, 2001, ACM Press, © 2001 ACM. 8 pp.

Patten, Recht, and Ishii. "Audiopad: A Tag-based Interface for Musical Performance." Proceedings of Conference on New Interface for Musical Expression (NIME '02). Dublin, Ireland, May 24-26, 2002 6pp.

Ramos and Balakrishnan. "Fluid Interaction Techniques for the Control and Annotation of Digital Video." UIST '03 Vancouver, B.C., Canada. © 2003 ACM 1-58133-636-06/03/0010. pp. 105-114.

Rekimoto and Ayatsuka "CyberCode: Designing Augmented Reality Environments with Visual Tags." Proc. of UIST 2000, 2000. 10pp.

Rekimoto and Matsushita. "Perceptual Surfaces :Towards a Human and Object Sensitive Interactive Display." Proceedings of Workshop on Perceptural User Interactes (PUI'97), 1997. 3pp.

Rekimoto and Nagao. "The World through the Computer: Computer Augmented Interaction with Real World Environments." Proceedings of UIST'95, 1995. pp. 29-36.

Rekimoto and Saitoh. "Augmented Surfaces: A Spatially Coninuous Work Space for Hybrid Computing Environments." CHI '99, May 15-20, 1999. Pittsburgh, Pennsylvania. © ACM 1999 0-201-48559-1/99/05. pp. 378-385.

Rekimoto, Jun. "Matrix: A Realtime Object Identification and Reistration Method for Augmented Reality." Proc. of Asia Pacific Computer Human Interaction (APCHI '98), 1998. 6pp.

Rekimoto, Jun. "Multiple-Computer User Interfaces: 'Beyond the Desktop' Direct Manipulation Environments." ACI CHI2000 Video Proceedings, 2000. 2pp.

Rekimoto, Jun. "Pick-and-Drop: A Direct Manipulation Technique for Multiple Computer Environments." Proceedings of UIST'97, 1997. pp. 31-39.

Rekimoto, Jun. "SmartSkin: An Infarastructure for Freehand Manipulation on Interactive Surfaces." *CHI 2002*, Apr. 20-25, 2002, Minneapolis, Minnesota. © 2001 ACM 1-58113-453-3/02/0004. 8pp.

Rekimoto, Ullmer, and Oba. "Data Tiles: A Modular Platform for Mixed Physical and Graphical Interactions." *SIGCHI'01*, Mar. 31-Apr. 4, 2001, Seattle, WA. © 2001 ACM 1-58113-327-8/01/0003. 8pp.

Reznik, Canny, and Alldrin. "Leaving on a Plane Jet." *2001 Int. Conf. on Intell. Robots & Systems* (*IROS*), Maui, Hawaii, Oct. 2001. 6pp.

Ringel, Gerh, Jin, and Winograd. "Barehands: Implement-Free Interaction with a Wall-Mounted Display." Short Talk. *CHI 2001* Mar. 31-Apr. 5. pp. 367-368.

Rosenfeld, Zawadzki, Sudol, and Perlin. "Planar Manipulator Display." New York University mrl. NYU Media Research Lab. Available http://cat.nyu.edu/PMD. Printed May 16, 2004. 3pp.

Rovani, David (Posted by). "My Second Month with the Compaq Tablet." *Home>Reviews*,TablePCHome.com—Table PC user community. Posted Apr. 10, 2003. Available http://www.tabletpchome.com/Messages.aspx?ThreadID=140. Printed Dec. 30, 2003. pp. 1-2 of 5.

Schmalstieg, Encarnação, and Szalavári. "Using Transparent Props for Interaction With The Virtual Table." Presented at *1999 ACM Symposium on Interactiave 3D Graphics* (*I3DG '99*). Apr. 26-28, 1999, Atlanta, GA. 7pp.

Scott, Grant, and Mandryk. "System Guidelines for Co-located collaborative Work on a Tabletop Display." *Proceedings of ECSCW'03, European Conference Computer-Supported Cooperative Work 2003*, Helsinki, Finland, Sep. 14-18, 2003. 20pp.

Shen, Everitt, and Ryall. "UbiTable: Impromptu Face-to-Face Collaboration on Horizontal Interactive Surfaces." © Mitsubishi Electric Research Laboratories, Inc., 2003. Cambridge, Massachusetts. TR-2003-49. Sep. 2003. 10pp.

Shen, Lesh, and Vernier. "Personal Digital Historian: Story Sharing Around the Table." *Interactions*. Mar. + Apr. 2003. pp. 15-22.

Shen, Lesh, Bernier, Forlines, and Frost. "Sharing and Building Digital Group Histories." *CSCW'02*, Nov. 16-20, 2002, New Orleans, Louisiana. © 2002 ACM 1-58113-560-2/02/0011. 10pp.

Shen, Lesh, Moghaddam, Beardsley, and Bardsley. "Personal Digital Historian: User Interface Design." © Mitsubishi Electric Research Laboratories, Inc. 2001. Cambridge, Massachusetts. 5pp.

Shen, Vernier, Forline, and Ringel. "DiamondSpin: An Extensible Toolkit for Around-the-Table Interaction." CHI 2004, Apr. 24-29, 2004, Vienna, Austria. © 2004 ACM 1-58113-702-8/04/0004. 8pp.

Smart Technologies Inc. White Paper. "DViT Digital Vision Touch Technology." Feb. 2003. 10pp.

Smart Technologies, Inc. "Rear Projection Smart Board™ Interactive Whiteboard" "Smart Board Software". Available http://www.smarttech.com/Products/rearprojection/index.asp and http://www.smarttech.com/Products/sbsoftware/index.asp. Printed Dec. 16, 2003. 5pp. total.

Starner, Leibe, Singletary, Lyons, Gandy, and Pair. "Towards Augmented Reality Gaming." Available http://www.gvu.gatech._Edu/ccg/publications/imagina2000/. Printed Dec. 30, 2003. 27pp.

Streitz, Geißler, Holmer, Konomi, Müer-Tomfelde, Reischl, Rexrogh, Seitz, and Steinmetz. "i-LAND: An interactive Landscape for Creativity and Innovation." *Proceedings of the ACM Conference on Human Factors in Computing Systems* (*CHI'99*), Pittsburgh, Pennsylvania, May 15-20, 1999. ACM Press, New York. pp. 120-127.

Symanzik, Jürgen. "Three-Dimensional Statistical Graphics Based on Interactively Animated Anaglyphs." Published 1993. Available http://citeseer.mj.nec.com/95667.html. Printed Feb. 25, 2004. 7pp. total.

"The Tablet PC A detailed look at Microsoft's proposed Tablet PC." *Pen Computing Magazine: Tablet PC*. Available http://www.pencomputing.com/frames/textblock_tablet_pc.html. Printed Dec. 30, 2003. pp. 1.

Tandler, Prante, Müer-Tomfelde, Streitz, and Steinmetz. "ConnecTables: Dynamic Coupling of Displays for the Flexible Creation of Shared Workspaces." *Proceedings of the 14. Annual ACM Symposium on User Interface Software and Technoic* (*USIT'01*), ACM Press (CHI Letters 3 (2)),2001,pp. 11-20 (10pp).

Ullmer and Ishii. "The metaDESK: Models and Prototypes for Tangible User Interfaces." Proceedings of UIST'97, Oct. 14-17, 1997. © 1997 ACM—ACM 0-89791-881-9/97/10. 10pp.

Ullmer, Ishii and Glas. "mediaBlocks: Physical Containers, Transports, and Controls for Online Media." *Computer Graphics Proceedings* (*SIGGRAPH'98*), Jul. 19-24, 1998, © 1998 ACM. ACM-0-89791-999-8 8/98/007. 8pp.

Ullmer, Ishii and Jacob. "Tangible query Interfaces: Physically Constrained Tokens for Manipulating Database Queries." Proc. *INTERACT 2003 Conference*, 2003. 11pp.

Underkoffler and Ishii. "Illuminating Light: An Optical Design Tool with a Luminous-Tangible Interface." *Proceeding of CHI '98*, Apr. 18-23, 1998, © 1998 ACM. pp. 1-8.

Underkoffler and Ishii. "Urp: A Luminous-Tangible Workbench for Urban Planning and Design." Proceedings of CHI '99. May 15-20, 1999. © 1998 ACM. pp. 1-8.

Underkoffler Ullmer, and Ishii. "Emancipated Pixels: Real-World Graphics in the Luminous Room." *Proceedings of SIGGRAPH '99*, Aug. 8-13, 1999, © 1999 ACM. 8pp.

Vernier, Lesh and Shen. "Visualization Techniques for Circular Tabletop Interfaces." To appear in *Advanced Visual Interfaces*, May 2002, Trento, Italy. © 2002 Mitsubishi Electric Research Laboratories, Inc. MERL-TR2002-01. Authored Mar. 2002. 10pp.

Viola and Jones. "Robust Real-time Object Detection." Cambridge Research Laboratory, Technical Report Series. Compaq. CRL 2001/01, Feb. 2001. 30pp.

"Virtualboard." Available http://visilab.unime.it/visilab/virtualboard.htm. Printed Dec. 16, 2003. 6pp.

Von Hardenberg and Bérard. Bare-Hand Human-Computer Interaction. PUI 2001 Orlando, FL, © 2001 ACM 1-58113-448-7-11/14/01. 8pp.

Wellner, Pierre. "Interacting with Paper on the DigitalDesk." *Communications of the ACM*. Jul. 1993. EuroPARC tech report EPC-93-195. 17pp.

Whalen, Tara. "Playing well with Others: Applying Board Game Design to Tabletop Display Interfaces." *UIST 2003*. Vancouver, Nov. 2-5, 2003, 3pp.

Wu and Balakrishnan. "Multi-Finger and Whole Hand Gestural Interaction Techniques for Multi-User Tabletop Displays." *UIST '03*, Vancouver, B.C., Canada. © 2003 ACM 1-58113-636-6/03/0010. pp. 193-202.

Hardenberg Von. Christian, "Fingertracking and Handposture Recognition for Real-Tim Human-Computer Interaction", Berlin, Jul. 20, 2001.

Kijma, Ryugo, et al. "Distributed Display Approach Using PHMD with Infrared Camera", Proceedings of the IEEE Virtual Rality, Orlando, Florida, Mar. 24-28, 2002. pp. 1-8.

Pavlidis, Ioannis, et al. "A Vehicle Occupant Counting System Based on Near-Infrared Phenomenology and Fuzzy Neural Classification", IEEE Transactions on Intelligent Transportation Systtem, New York, NY, vol. 1, No. 2., Jun. 2000, pp. 78-80.

"The Tracking Cube: A Three Dimensional Input Device" IBM Techincal Disclosure Bulletin, IBM Corp. New York, US, vol. 32, No. 3B; Aug. 1, 1989, pp. 91-95.

Northop Grumman "TouchTable™" Brochure © 2005 Northop Grumman Space & Mission Systems Corp. RS1190705. 2pp.

Department of Defense, Department of Defense Logistics Automatic Indentification Technology Handbook for Product and Shipping Label Quality Assurance, Feb. 15, 2000, p. 14, Section 3.3.3.6, http://www.dodait.com/conf/data1199/printquality/print0111r6.doc.

Strickson, Joshua and Paradiso, Joseph; "Tracking Hands Above Large Interactive Surfaces with Low-Cost Scanning Laser Rangefinder" ACM CHI. 98 Conference, Apr. 21-23, 1998, Los Angeles, CA.; pp. 1-2.

Lensch, Hendrick P.A.; Goesele, Michael; Jan Kautz; Hans-Peter Seidel; "A Framework for the Acquisition, processing, Transmission, and Interactive Display of High Quality 3D Models on the Web" Research Report, Max-Planck-Institute, May 2001; Sections 5 and 8.

U.S. Appl. No. 10/880,167, Mar. 25, 2008, Office Action.
U.S. Appl. No. 10/880,167, Oct. 8, 2008, Notice of Allowance.
U.S. Appl. No. 10/880,167, Dec. 31, 2008, Notice of Allowance.
U.S. Appl. No. 10/834,675, Jun. 29, 2007, Office Action.
U.S. Appl. No. 10/834,675, Dec. 13, 2007, Office Action.
U.S. Appl. No. 10/834,675, Mar. 28, 2008, Notice of Allowance.
U.S. Appl. No. 10/814,761, Oct. 16, 2007, Notice of Allowance.
U.S. Appl. No. 10/814,761, Feb. 27, 2008, Notice of Allowance.
U.S. Appl. No. 10/870,777, Aug. 30, 2007, Office Action.
U.S. Appl. No. 10/870,777, Feb. 28, 2008, Notice of Allowance.
U.S. Appl. No. 10/870,777, Aug. 29, 2008, Office Action.
U.S. Appl. No. 10/870,777, May 6, 2009, Notice of Allowance.
U.S. Appl. No. 10/867,434, Oct. 9, 2007, Office Action.
U.S. Appl. No. 10/867,434, Jul. 10, 2008, Office Action.
U.S. Appl. No. 10/867,434, Nov. 28, 2008, Office Action.
U.S. Appl. No. 10/867,434, Sep. 17, 2009, Office Action.
U.S. Appl. No. 10/969,746, Apr. 23, 2008, Notice of Allowance.
U.S. Appl. No. 10/969,746, Oct. 17, 2008, Notice of Allowance.
U.S. Appl. No. 10/969,746, Mar. 11, 2009, Notice of Allowance.
U.S. Appl. No. 11/117,979, Jun. 12, 2008, Office Action.
U.S. Appl. No. 11/117,979, Sep. 11, 2008, Notice of Allowance.
U.S. Appl. No. 11/117,979, Nov. 14, 2008, Notice of Allowance.
U.S. Appl. No. 10/813,855, Oct. 9, 2007, Office Action.
U.S. Appl. No. 10/813,855, May 7, 2008, Office Action.
U.S. Appl. No. 10/813,855, Feb. 19, 2009, Office Action.
U.S. Appl. No. 10/813,855, Sep. 24, 2009, Office Action.
U.S. Appl. No. 12/106,910, Oct. 30, 2008, Office Action.
U.S. Appl. No. 12/106,910, Jun. 26, 2009, Notice of Allowance.
U.S. Appl. No. 11/364,319, Jun. 26, 2008, Office Action.
U.S. Appl. No. 11/364,319, Dec. 31, 2008, Notice of Allowance.
U.S. Appl. No. 11/170,234, Sep. 2, 2008, Office Action.
U.S. Appl. No. 11/170,234, Jan. 12, 2009, Notice of Allowance.
U.S. Appl. No. 11/321,551, Feb. 8, 2008, Office Action.
U.S. Appl. No. 11/321,551, Aug. 19, 2008, Office Action.
U.S. Appl. No. 11/321,551, Jan. 26, 2009, Office Action.
U.S. Appl. No. 11/321,551, Aug. 4, 2009, Office Action.
U.S. Appl. No. 11/321,551, Oct. 26, 2009, Office Action.
U.S. Appl. No. 11/218,171, Oct. 7, 2008, Office Action.
U.S. Appl. No. 11/218,171, Apr. 15, 2009, Office Action.
U.S. Appl. No. 11/218,171, Nov. 23, 2009, Office Action.
U.S. Appl. No. 10/867,434, Jan. 4, 2010, Office Action.
U.S. Appl. No. 11/321,551, Mar. 31, 2010, Office Action.
U.S. Appl. No. 10/867,434, Jun. 14, 2010, Notice of Allowance.
U.S. Appl. No. 11/218,171, Jun. 17, 2010, Office Action.
U.S. Appl. No. 10/813,855, Jun. 22, 2010, Office Action.
U.S. Appl. No. 12/110,032, Jul. 8, 2010, Office Action.
U.S. Appl. No. 11/321,551, Jul. 9, 2010, Office Action.
U.S. Appl. No. 12/110,032, Nov. 2, 2010, Notice of Allowance.
U.S. Appl. No. 11/218,171, Dec. 13, 2010, Notice of Allowance.
U.S. Appl. No. 12/110,032, Dec. 20, 2010, Notice of Allowance.
U.S. Appl. No. 12/492,178, Feb. 25, 2011, Office Action.
Dynamic Lighting System for Specular Surface Inspection; R. Seulin, F. Meriennr, P. Gorria; Laboratories Le2i, Univ. de Bourgogne, Le Creusot, France, 71200 (11 pages), 2001.
Machine Vision System for Specular Surface Inspection: Use of Simulation Process as a Tool for Design and Optimization; E. Seulin, F. Merienne and P. Gorria; (6 pages), 2001.
Author not listed, "Dense Estimation of Serface Reflectance Properties of Objects" with Interreflections, Dec. 10, 2002, 4 pages.
Feris, Rogerio et al., "Specular Reflection Reduction with Multi-Flash Imaging", published 2004, 6 pages.
U.S. Appl. No. 12/492,178, Jan. 6, 2012, Notice of Allowance.
U.S. Appl. No. 11/620,591, Mar. 19, 2009, Office Action.
U.S. Appl. No. 11/620,591, Sep. 18, 2009, Notice of Allowance.
U.S. Appl. No. 11/627,861, Jun. 3, 2011, Office Action.
U.S. Appl. No. 11/627,861, Aug. 24, 2011, Office Action.
U.S. Appl. No. 11/627,861, Nov. 16, 2011, Office Action.
U.S. Appl. No. 13/250,101, filed Sep. 30, 2011, Bilow.
U.S. Appl. No. 11/321,551, Jul. 11, 2011, Notice of Allowance.

INPUT METHOD FOR SURFACE OF INTERACTIVE DISPLAY

CROSS-REFERENCE TO RELATED APPLICATIONS

This application is a continuation of, and claims the benefit of and priority to, U.S. patent application Ser. No. 11/218,171, filed on Aug. 31, 2005, and entitled "INPUT METHOD FOR SURFACE OF INTERACTIVE DISPLAY TABLE," which application is hereby expressly incorporated herein by this reference in its entirety.

BACKGROUND

The utility of computer systems can be enhanced by providing better user interfaces. User interfaces for computers systems have evolved significantly since the personal computer (PC) first became widely available. Early PCs used rather primitive user input devices, such as the serial mouse. However, the vast improvement in microprocessors, available memory, and programming functionality have all contributed to the advancement of user interface design and the development of user friendly graphic operating systems and hardware. One particular area of advancement in user interface technology pertains to the detection of an object near a user interface, which is sometimes referred to as proximity detection. Generally, as applied to user interfaces, proximity detection is thus concerned with the detection of objects, including inanimate objects and/or a user's hand or finger, for example, when in proximity of a user interface or surface.

There are several detection technologies that may be used for proximity detection in connection with a user interface, including capacitance-based systems, and various optical-based detection systems. The following discussion focuses on the use of optical-based proximity detection. Optical-based proximity detection techniques have been developed that provide for illuminating an entire user interface surface with light and) employ a digital video camera to recognize objects that are either in contact or proximate to a graphic display surface, based upon the light reflected from the objects. Such systems require sufficient illumination of the user interface surface by the system to overcome ambient illumination in order to differentiate objects within the view field of the digital camera. Methods to reduce the undesired effects of ambient light on detecting objects in such systems include increasing the number of illumination sources, increasing the power of the illumination sources, polarizing the illumination light emitted by the light sources used to detect objects, filters for wavelength discrimination, and various modulation techniques. Each of these techniques have drawbacks in achieving the desired even illumination of the view field.

Another recent development with regard to user interfaces for computer systems includes the advent of interactive displays. An interactive display presents graphic images to a user on a flat surface, such as the top of a table. A PC is coupled to the interactive display to provide a rich user interactive experience that offers more sophisticated command and interface features, and a far more natural interactive experience in providing input to the system. An initial embodiment of the interactive display employs proximity-detection for responding to the user interaction with the display surface, but has experienced some of the problems noted above that are common to other optical-based object proximity detection systems. Therefore, it has become more important to provide a more robust optical object proximity detection scheme that is less affected by ambient light.

SUMMARY

Several implementations of an interactive display are described below in detail. One aspect of these implementations that are described relates to a method for detecting an object or user input provided with an object, where the object is on or adjacent to an interactive display surface, by using a scanning light source. The described method includes the step of illuminating the interactive display surface with a scanning light source. The scanning light source can be configured to emit light of a predetermined wavelength and to scan at least a portion of the interactive display surface with the light of the predetermined wavelength, so that at least the portion of the interactive display surface is fully scanned over time. Light of the predetermined wavelength that is reflected from an object that is on or adjacent to the interactive display surface is thus detected, as the scanning light source is illuminating the object.

Another implementation discussed in further detail below relates to an interactive display system configured for detecting an object or user input provided with an object. The interactive display system is described as having an interactive display surface on which graphic images are displayed. The interactive display system can include one or more scanning light sources, which can be configured for scanning the interactive display surface so that at least part of the interactive display surface is fully scanned over time. The interactive display system is further described as including a light detector that can be configured for detecting light reflected from an object that is adjacent to or in contact with the interactive display surface. A computing system is in communication with the scanning light source and the light detector. The computing system can include a processor and a memory having machine instructions that can cause the processor to carry out a plurality of interactive display functions, such as illuminating the interactive display surface with the scanning light source and detecting light associated with the scanning light source that is reflected from an object that is on or adjacent to the interactive display surface. The reflected light is detected with the light detector while the scanning light source is illuminating at least the portion of the interactive display surface. The memory stores machine instructions for generating an output signal based on the detected light that is reflected from an object that is on or adjacent to the interactive display surface.

Yet another implementation discussed in detail below relates to a method for receiving user input to an interactive display system that is configured to detect objects on or adjacent to an interactive display surface. The method associates each of a plurality of scanning light sources with one or more of a plurality of different surface area portions of the interactive display surface. According to this step, a combination of the different surface area portions substantially correspond to the interactive display surface that can be employed for receiving user input. The method also includes the steps of illuminating each of the different surface area portions of the interactive display surface with at least one of the plurality of scanning light sources within a predetermined time interval and then detecting light that is reflected from one or more objects that are on or adjacent to at least one of the different surface area portions. As discussed in greater detail below, at least one of the scanning light sources provides a source for the light that is reflected when the scanning light source is providing the illumination. The method further includes the step of generating a plurality of object detection signals in response to detecting light reflected from one or more objects that are on or adjacent to each of the plurality of different surface area portions. Finally, the method includes the step of processing the plurality of object detection signals to determine the user input associated with light reflected from one or more objects that are on or adjacent to the interactive display surface.

This Summary has been provided to introduce a few concepts in a simplified form that are further described in detail below in the Description. However, this Summary is not intended to identify key or essential features of the claimed subject matter, nor is it intended to be used as an aid in determining the scope of the claimed subject matter.

DRAWINGS

Various aspects and attendant advantages of one or more exemplary embodiments and modifications thereto will become more readily appreciated as the same becomes better understood by reference to the following detailed description, when taken in conjunction with the accompanying drawings, wherein.

DESCRIPTION

Figures and Disclosed Embodiments Are Not Limiting

Exemplary embodiments are illustrated in referenced Figures of the drawings. It is intended that the embodiments and Figures disclosed herein are to be considered illustrative rather than restrictive. Furthermore, in the claims that follow, when a list of alternatives uses the conjunctive "and" following the phrase "at least one of" or following the phrase "one of," the intended meaning of "and" corresponds to the conjunctive "or."

Exemplary Computing System

Figure 1:
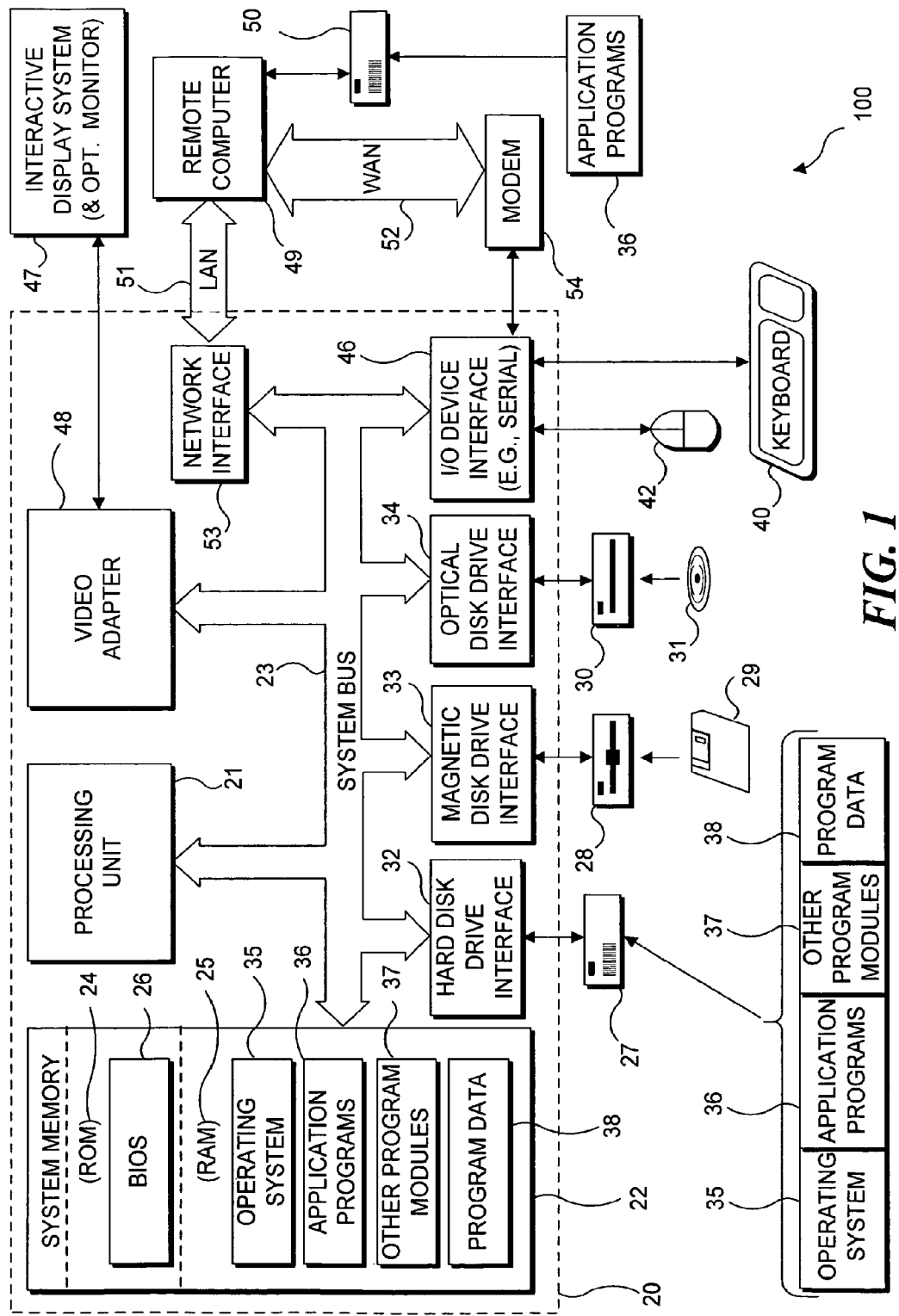
FIG. 1 is a functional block diagram of a generally conventional computing device or PC that is suitable for use with an interactive display surface in practicing the present invention.

FIG. 1 is a functional block diagram of an exemplary computing system and/or computer server for serving digital media to the computing device of connected clients, such as an interactive display table or a similar computing system.

The following discussion is intended to provide a brief, general description of a suitable computing environment in which certain methods may be implemented. Further, the following discussion illustrates a context for implementing computer-executable instructions, such as program modules, with a computing system. Generally, program modules include routines, programs, objects, components, data structures, etc., that perform particular tasks or implement particular abstract data types. The skilled practitioner will recognize that other computing system configurations may be applied, including multiprocessor systems, mainframe computers, personal computers, processor-controlled consumer electronics, personal digital assistants (PDAs) (but likely not when used as a server of digital media content), and the like. One implementation includes distributed computing environments where tasks are performed by remote processing devices that are linked through a communications network. In a distributed computing environment, program modules may be located in both local and remote memory storage devices.

With reference to FIG. 1, an exemplary system suitable for implementing various methods is depicted. The system includes a general purpose computing device in the form of a conventional PC 20, provided with a processing unit 21, a system memory 22, and a system bus 23. The system bus couples various system components including the system memory to processing unit 21 and may be any of several types of bus structures, including a memory bus or memory controller, a peripheral bus, and a local bus using any of a variety of bus architectures. The system memory includes read only memory (ROM) 24 and random access memory (RAM) 25.

A basic input/output system 26 (BIOS), which contains the fundamental routines that enable transfer of information between elements within the PC 20, such as during system start up, is stored in ROM 24. PC 20 further includes a hard disk drive 27 for reading from and writing to a hard disk (not shown), a magnetic disk drive 28 for reading from or writing to a removable magnetic disk 29, and an optical disk drive 30 for reading from or writing to a removable optical disk 31, such as a compact disk-read only memory (CD-ROM) or other optical media. Hard disk drive 27, magnetic disk drive 28, and optical disk drive 30 are connected to system bus 23 by a hard disk drive interface 32, a magnetic disk drive interface 33, and an optical disk drive interface 34, respectively. The drives and their associated computer readable media provide nonvolatile storage of computer readable machine instructions, data structures, program modules, and other data for PC 20. Although the described exemplary environment employs a hard disk 27, removable magnetic disk 29, and removable optical disk 31, those skilled in the art will recognize that other types of computer readable media, which can store data and machine instructions that are accessible by a computer, such as magnetic cassettes, flash memory cards, digital video disks (DVDs), Bernoulli cartridges, RAMs, ROMs, and the like, may also be used.

A number of program modules may be stored on the hard disk 27, magnetic disk 29, optical disk 31, ROM 24, or RAM 25, including an operating system 35, one or more application programs 36, other program modules 37, and program data 38. A user may enter commands and information in PC 20 and provide control input through input devices, such as a keyboard 40 and a pointing device 42. Pointing device 42 may include a mouse, stylus, wireless remote control, or other pointer, but in connection with the presently described embodiments, such conventional pointing devices may be omitted, since the user can employ an interactive display system for input and control. As used in the following description, the term "mouse" is intended to encompass any pointing device that is useful for controlling the position of a cursor on the screen. Other input devices (not shown) may include a microphone, joystick, haptic joystick, yoke, foot pedals, game pad, satellite dish, scanner, or the like. Also, PC 20 may include a Bluetooth radio or other wireless interface for communication with other interface devices, such as printers, or the interactive display table described in detail below. These and other input/output (I/O) devices can be connected to processing unit 21 through an I/O interface 46 that is coupled to system bus 23. The phrase "I/O interface" is intended to encompass each interface specifically used for a serial port, a parallel port, a game port, a keyboard port, and/or a universal serial bus (USB). System bus 23 can also be connected to a camera interface (not shown), which is coupled to an interactive display 60 in order to receive signals from a digital video camera that is included within interactive display 60, as discussed in greater detail below. The digital video camera may be instead coupled to an appropriate serial I/O port, such as to a USB port. System bus 23 can also be connected through I/O interface 46 or another interface, to a light source within an interactive display in order to provide control signals to the light source, as discussed in greater detail below. Furthermore, system bus 23 can also be connected through I/O interface 46 or another interface to a light detector within an interactive display in order to receive user input. Optionally, a monitor 47 can be connected to system bus 23 via an appropriate interface, such as a video adapter 48; however, the interactive display system described below can provide a much richer display and also interact with the user for input of information and control of software applications and is therefore preferably coupled to the video adaptor. In general, PCs can also be coupled to other peripheral output devices (not shown), such as speakers (through a sound card or other audio interface—not shown) and printers.

Certain methods described in detail below, can be practiced on a single machine, although PC 20 can also operate in a networked environment using logical connections to one or more remote computers, such as a remote computer 49. Remote computer 49 can be another PC, a server (which can be configured much like PC 20), a router, a network PC, a peer device, or a satellite or other common network node, (all not shown) and typically includes many or all of the elements described above in connection with PC 20, although only an external memory storage device 50 has been illustrated in FIG. 1. The logical connections depicted in FIG. 1 include a local area network (LAN) 51 and a wide area network (WAN) 52. Such networking environments are common in offices, enterprise-wide computer networks, intranets, and the Internet.

When used in a LAN networking environment, PC 20 is connected to LAN 51 through a network interface or adapter 53. When used in a WAN networking environment, PC 20 typically includes a modem 54, or other means such as a cable modem, Digital Subscriber Line (DSL) interface, or an Integrated Service Digital Network (ISDN) interface for establishing communications over WAN 52, such as the Internet. Modem 54, which may be internal or external, is connected to the system bus 23 or coupled to the bus via I/O device interface 46, i.e., through a serial port. In a networked environment, program modules, or portions thereof, used by PC 20 may be stored in the remote memory storage device. It will be appreciated that the network connections shown are exemplary and other means of establishing a communications link between the computers may be used, such as wireless communication and wide band network links.

Exemplary Interactive Surface

Figure 2:
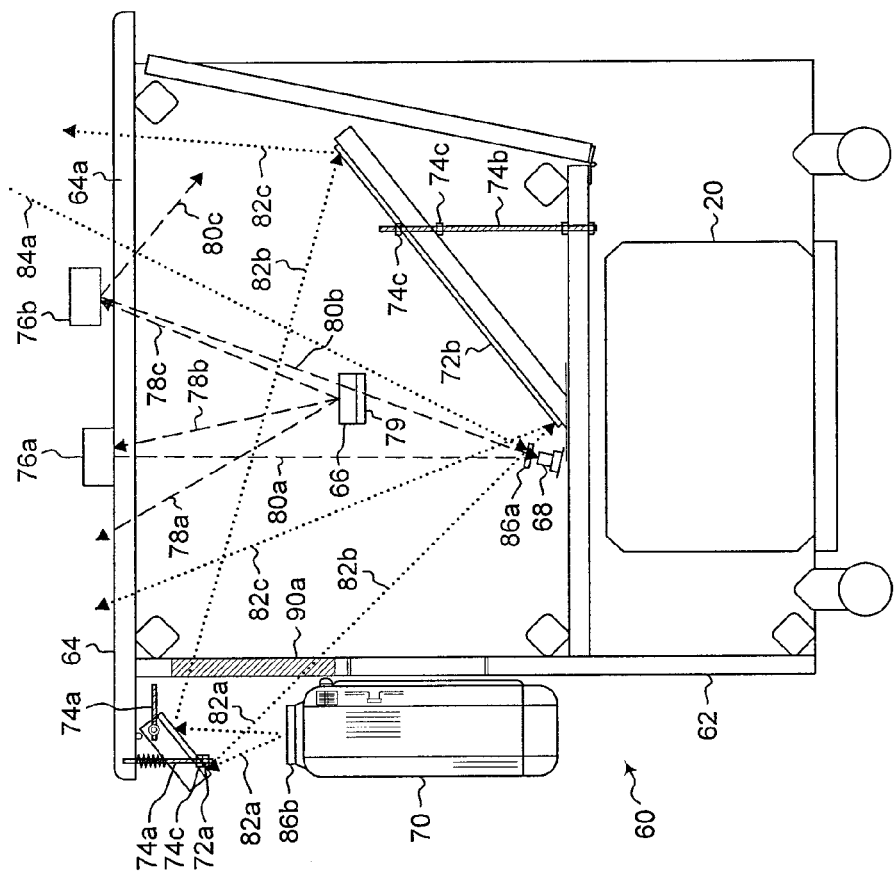
FIG. 2 is a cross-sectional view illustrating internal components of an interactive display surface in the form of an interactive display table that includes an integral PC.

In FIG. 2, an exemplary interactive display table 60 is shown that includes PC 20 within a frame 62 and which serves as both an optical input and video display device for the computer. The depicted embodiment is a cut-away figure of one implementation of interactive display table 60. In the embodiment shown in FIG. 2, rays of light 82a-82c used for displaying text and graphic images are illustrated using dotted lines, while rays of infrared (IR) light used for sensing objects on or just above an interactive display surface 64 of interactive display table 60 are illustrated using dashed lines. The perimeter of the table surface is useful for supporting a user's arms or other objects, including objects that may be used to interact with the graphic images or virtual environment being displayed on interactive display surface 64.

Scanning light source 66 can comprise any of a variety of light emitting devices, such as a light emitting diode (LED), laser diode, and other suitable scanning light sources that are driven to scan in two orthogonal dimensions, i.e., in the X and Y directions. The scanning mechanism used for scanning light source 66 and for each of the other scanning light sources discussed below can be a rotating mirror, a galvanometer mirror, or other well known scanning mechanisms commonly used for producing a raster scan of a surface with a light beam. In general, scanning light source 66 is configured for emitting light having a wavelength in the infrared (IR) spectrum, which is therefore not visible to the human eye. However, any wavelength of light can be used that is invisible to the human eye, so as to avoid interfering with the display of visible images provided on interactive display surface 64. Scanning light source 66 can be mounted in any position on the interior side of frame 62, depending on the particular light source used. The light that is produced by scanning light source 66 is directed upwardly toward the underside of interactive display surface 64, as indicated by dashed lines 78a, 78b, and 78c. Light emitted from scanning light source 66 is reflected from any objects that are on or adjacent to interactive display surface 64 after passing through a translucent layer 64a of the table, comprising a sheet of vellum or other suitable translucent material with light diffusing properties.

As used in the description and claims that follow, the term "proximate to" is used with the intent that this phrase encompass both an object that is either touching the interactive display surface or is separated from the interactive display surface by short distance, e.g., by up to 3 centimeters or more, depending on factors such as the reflectivity of the object. Although only one scanning light source 66 is shown, it will be appreciated that a plurality of such light sources may be mounted at spaced-apart locations around the interior sides of frame 62 to provide an even illumination of the interactive display surface. The light produced by scanning light source 66 may either exit through the table surface without illuminating any objects, as indicated by dash line 78a; illuminate objects on the table surface, as indicated by dash line 78b; and/or illuminate objects a short distance above (i.e., proximate to) the interactive display surface but not touching it, as indicated by dash line 78c.

Objects above interactive display surface 64 include a "touch" object 76a that rests "on" or at least partially touches the display surface, and a "hover" object 76b that is close to, but not in actual contact with the interactive display surface.

Thus, both touch and hover objects can be "adjacent to" the display surface, as that term is used in the following description. As a result of using translucent layer 64a under the interactive display surface to diffuse light passing through the interactive display surface, as an object approaches the top of interactive display surface 64, the amount of IR light that is reflected by the object increases to a maximum level when the object is actually in contact with the display surface.

As illustrated in FIG. 2, a light detector 68 is mounted to frame 62 below interactive display surface 64, in a position appropriate to detect IR light that is reflected from a "touch" object or "hover" object disposed above (i.e., adjacent to) the interactive display surface. In general, light detector 68 can be any light detection device suitable for detecting light reflected from objects on or adjacent to interactive display surface 64. For example, light detector 68 can be an area CMOS or area charged coupled device (CCD) sensor. While the implementation shown in FIG. 2 depicts one light detector 68, a plurality of light detectors 68 can be employed within interactive display 60. Light detector 68 can be equipped with an IR pass filter 86a that transmits only IR light and blocks ambient visible light traveling through interactive display surface 64 along dotted line 84a. In this implementation, a baffle 79 is disposed between scanning light source 66 and the light detector 68 to prevent IR light that is directly emitted from scanning light source 66 from entering light detector 68, since it is preferable that light detector 68 produce an output signal that is only responsive to IR light reflected from objects that are adjacent to interactive display surface 64. It will be apparent that light detector 68 will also respond to any IR light included in the ambient light that passes through interactive display surface 64 from above and into the interior of the interactive display, including ambient IR light that also travels along the path indicated by dotted line 84a.

IR light reflected from objects on or above the table surface may be: (a) reflected back through translucent layer 64a, through IR pass filter 86a and into light detector 68, as indicated by dash lines 80a and 80b; or, (b) reflected or absorbed by other interior surfaces within the interactive display 60 without entering light detector 68, as indicated by dash line 80c.

Translucent layer 64a diffuses both incident and reflected IR light. Thus, as explained above, "hover" objects such as hover object 76b that are closer to interactive display surface 64 will reflect more IR light back to light detector 68 than objects of the same reflectivity that are farther away from the display surface. Light detector 68 senses the IR light reflected from "touch" and "hover" objects within its operating field and produces a detection signal corresponding to the reflected IR light that it receives. This detection signal is input to the PC 20 for processing to determine a location of each such object, and optionally, other parameters, such as the size, orientation, shape, and trajectory of the object. It should be noted that a portion of an object, such as a user's forearm, may be above the table while another portion, such as the user's finger, is in contact with the display surface. In addition, other parameters associated with an object may be detected. For example, an object may include an IR light reflective pattern or coded identifier, such as a bar code, on its bottom surface that is specific to that object or to a class of related objects of which that object is a member. Accordingly, the detection signal from one or more light detectors 68 can also be used for detecting each such specific object, as well as determining other parameters of the object or associated with the object, in response to the IR light reflected from the object and/or from a reflective pattern.

Embodiments are thus operable to recognize an object and/or its position relative to the interactive display surface 64, as well as other information, by detecting its identifying characteristics using the reflected IR light from the object. Details of the logical steps implemented to thus detect and identify an object, its orientation, and other parameters are explained in the commonly-assigned patent applications, including application Ser. No. 10/814,577 entitled "Identification Of Object On Interactive Display Surface By Identifying Coded Pattern," and application Ser. No. 10/814,761 entitled "Determining Connectedness And Offset Of 3D Objects Relative To An Interactive Surface," both of which were filed on Mar. 31, 2004. The disclosure and drawings of these two patent applications are hereby specifically incorporated herein by reference (as background information), but are not viewed as essential to enabling the novel approach claimed below.

Figure 3:
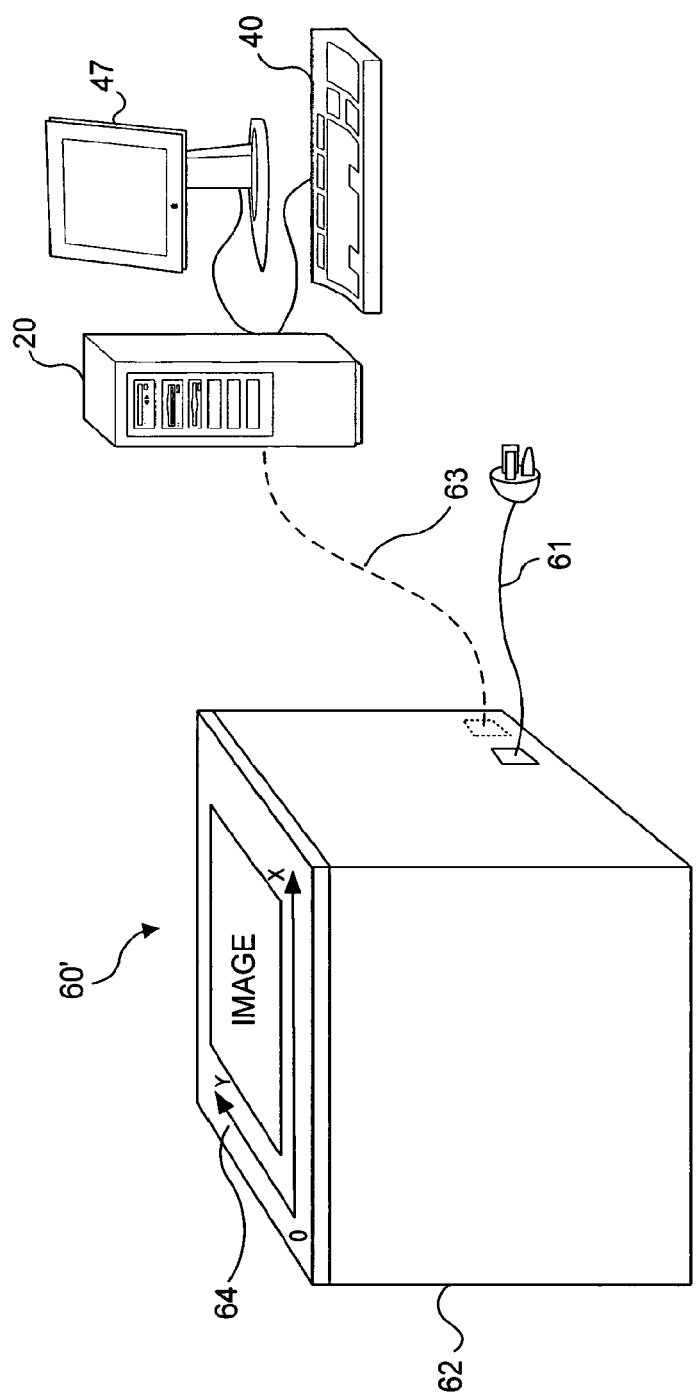
FIG. 3 is an isometric view of an embodiment in which the interactive display table is connected to an external PC.

PC 20 may be integral to interactive display table 60, as shown in the embodiment of FIG. 2, or alternatively, may instead be external to the interactive display table, as shown in the embodiment of FIG. 3. In FIG. 3, an interactive display table 60' is connected through a data cable 63 to an external PC 20 (which includes optional monitor 47, as mentioned above). Alternatively, external PC 20 can be connected to interactive display table 60' via a wireless link (i.e., WiFi or other appropriate radio signal link). As also shown in this Figure, a set of orthogonal X and Y axes are associated with interactive display surface 64, as well as an origin indicated by "0." While not discretely shown, it will be appreciated that a plurality of coordinate locations along each orthogonal axis can be employed to specify any location on interactive display surface 64.

If an interactive display table 60' is connected to an external PC 20 (as in FIG. 3) or to some other type of external computing device, such as a set top box, video game, laptop computer, or media computer (not shown), then interactive display table 60' comprises an input/output device. Power for interactive display table 60' is provided through a power lead 61, which is coupled to a conventional alternating current (AC) source (not shown). Data cable 63, which connects to interactive display table 60', can be coupled to a USB 2.0 port, an Institute of Electrical and Electronics Engineers (IEEE) 1394 (or Firewire) port, or an Ethernet port on PC 20. It is also contemplated that as the speed of wireless connections continues to improve, interactive display table 60' might also be connected to a computing device, such as PC 20 via such a high speed wireless connection, or via some other appropriate wired or wireless data communication link. Whether included internally as an integral part of the interactive display system, or externally, PC 20 executes algorithms for processing the digital images from digital video camera 68 and executes software applications that are designed to employ the more intuitive user interface functionality of interactive display table to good advantage, as well as executing other software applications that are not specifically designed to make use of such functionality, but can still make good use of the input and output capability of the interactive display table. As yet a further alternative, the interactive display system can be coupled to an external computing device, but include an internal computing device for doing image processing and other tasks that would then not be done by the external PC.

An important and powerful feature of interactive display table 60 or 60' (i.e., of either of the embodiments of the interactive display table discussed above) is its ability to display graphic images or a virtual environment for games or other software applications and to enable a user interaction with the graphic image or virtual environment visible on interactive display surface 64, by identifying objects (or characteristics thereof) that are resting atop the display surface, such as an object 76a, or that are hovering just above it, such as an object 76b.

Again referring to FIG. 2, interactive display table 60 can include a video projector 70 that is used to display graphic images, a virtual environment, or text information on interactive display surface 64. The video projector can be a liquid crystal display (LCD) or digital light processor (DLP) type, or a liquid crystal on silicon (LCOS) display type, with a resolution of at least 640.times.480 pixels, for example. An IR cut filter 86b can be mounted in front of the projector lens of video projector 70 to prevent IR light emitted by the video projector from entering the interior of the interactive display table housing where the IR light might interfere with the IR light reflected from object(s) on or above interactive display surface 64. Video projector 70 projects light along dotted path 82a toward a first mirror assembly 72a. First mirror assembly 72a reflects projected light from dotted path 82a received from video projector 70 along dotted path 82b through a transparent opening 90a in frame 62, so that the reflected projected light is incident on a second mirror assembly 72b. Second mirror assembly 72b reflects light from dotted path 82b along dotted path 82c onto translucent layer 64a, which is at the focal point of the projector lens, so that the projected image is visible and in focus on interactive display surface 64 for viewing.

Alignment devices 74a and 74b are provided and include threaded rods and rotatable adjustment nuts 74c for adjusting the angles of the first and second mirror assemblies to ensure that the image projected onto the display surface is aligned with the display surface. In addition to directing the projected image in a desired direction, the use of these two mirror assemblies provides a longer path between projector 70 and translucent layer 64a to enable a longer focal length (and lower cost) projector lens to be used with the projector. In some alternate implementations, described in more detail below an LCD panel or an organic light emitting display (OLED) panel can be employed instead of a video projector.

The foregoing and following discussions describe an interactive display device in the form of interactive display table 60 and 60'. Nevertheless, it is understood that the interactive display surface need not be in the form of a generally horizontal table top. The principles described in this description suitably also include and apply to display surfaces of different shapes and curvatures and that are mounted in orientations other than horizontal. Thus, although the following description refers to placing physical objects "on" the interactive display surface, physical objects may be placed adjacent to the interactive display surface by placing the physical objects in contact with the display surface, or otherwise adjacent to the display surface.

Figure 4A:
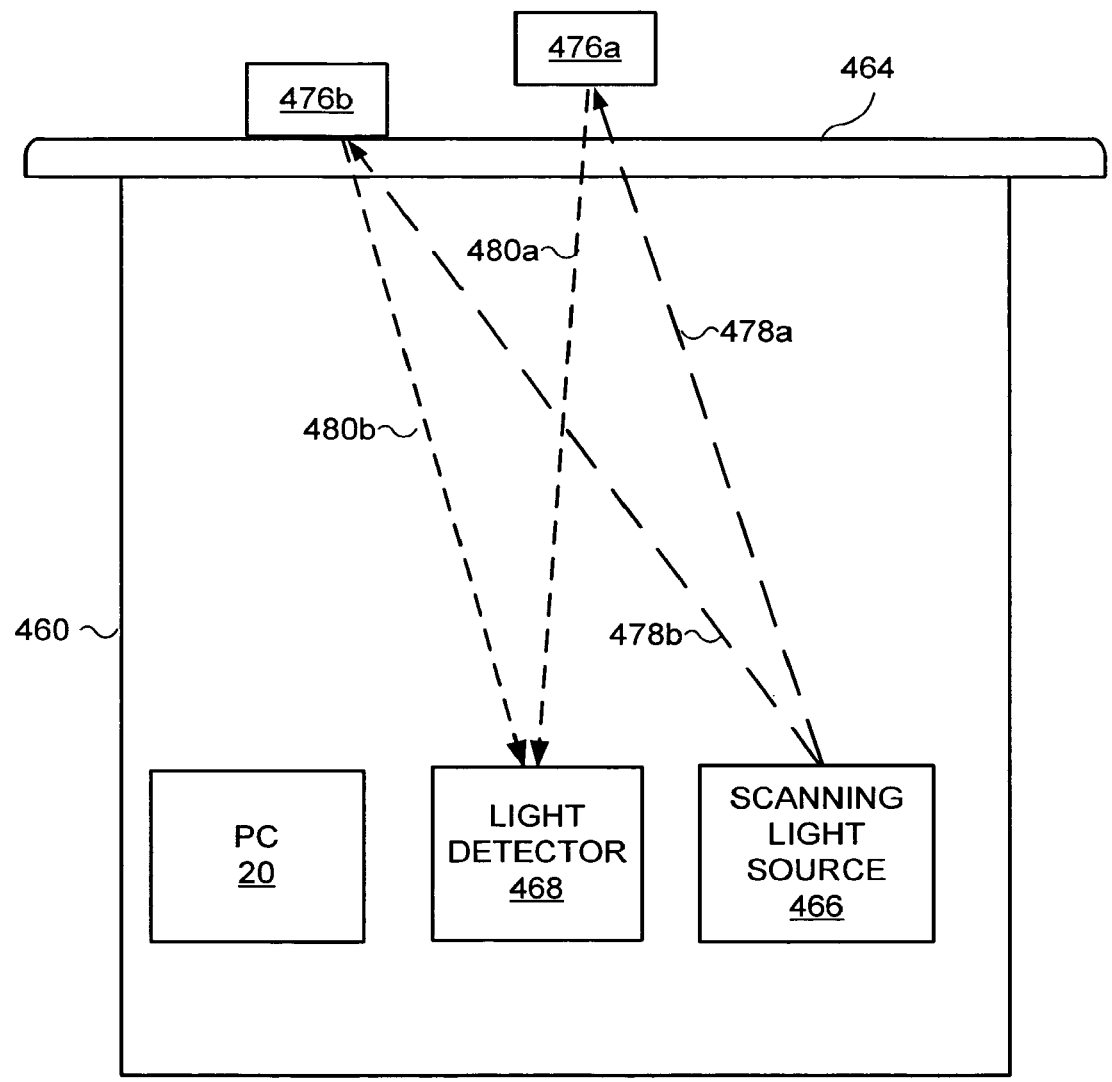
FIG. 4A is a schematic cross sectional illustration of an interactive display surface that includes a separate scanning light source and area detector that generally detects reflected light from a portion of the interactive display surface being scanned.
Figure 4B:
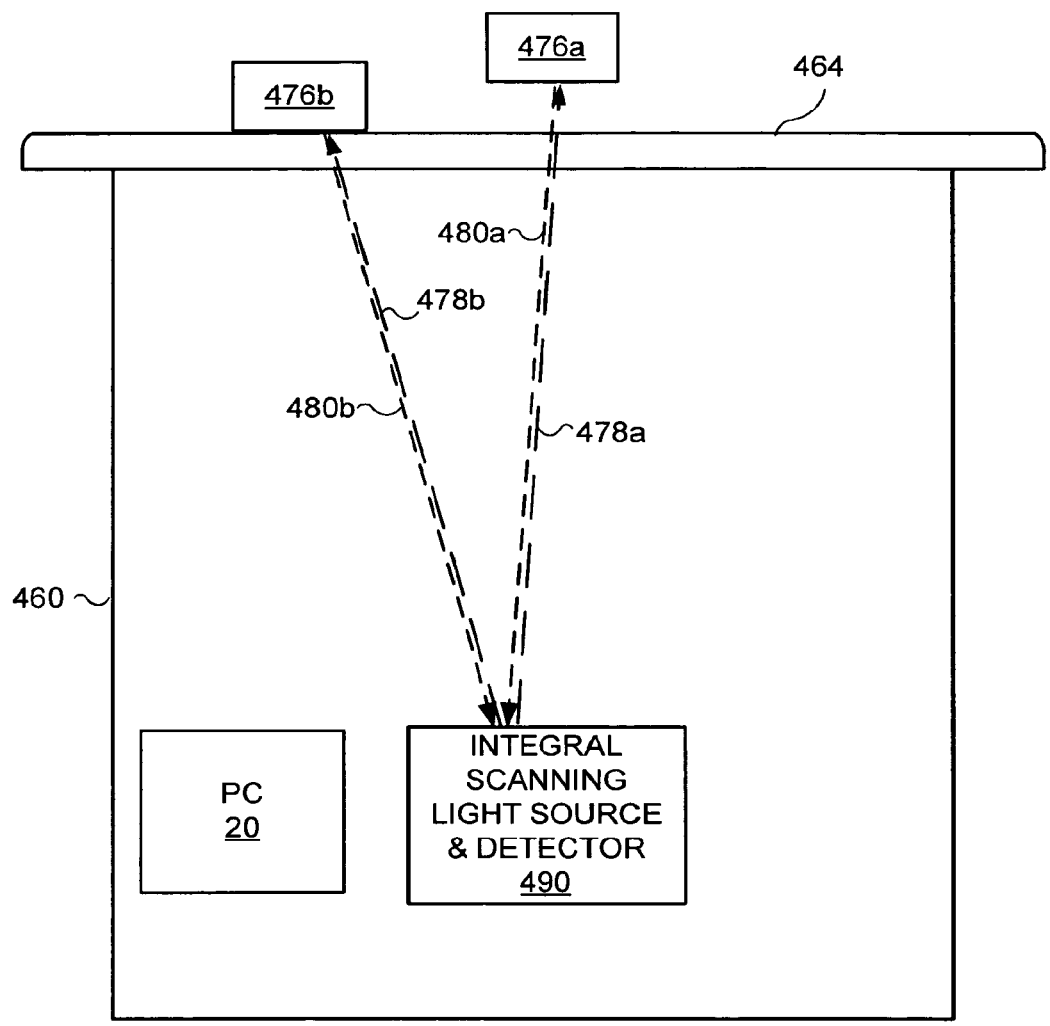
FIG. 4B is a schematic cross sectional illustration of an interactive display surface that includes an integral scanning light source and scanning detector that scan together.

Turning now to FIG. 4A, a simplified schematic cross sectional illustration of an interactive display surface 460 is provided that includes a scanning light source 466 and a light detector 468. A hover object 476a is shown above display surface 464, and a touch object 476b is shown in contact with display surface 464. PC 20 is configured to control scanning light source 466 and light detector 468. In one implementation, which is illustrated in FIG. 4B, light detector 468 and scanning light source 466 are replaced by an integral scanning light source and scanning light detector 490, so that the same scanning mechanism (not shown) drives the scanning light source and the scanning light detector to scan the same portion of the interactive display surface simultaneously. One advantage of this solution over prior art "full area illumination" is that less overall system illumination power is required. The illumination beam is spatially small in cross-sectional size, but much brighter, so that the illumination beam is concentrated in a small area that is scanned over the portion of the interactive displays surface.

In operation, interactive display system 460 (FIG. 4A) can be configured for illuminating interactive display surface 464 with scanning light source 466 such that the light source emits light of a predetermined wavelength and scans a portion of the interactive display surface with the light of the predetermined wavelength. The interactive display surface is fully scanned over a desired time interval. Interactive display system 460 can also be configured for detecting light of the predetermined wavelength that is reflected from an object that is on or adjacent to the interactive display surface—but without scanning a light detector over the interactive display surface; the light that is reflected is detected as the scanning light source is illuminating the object with the light of the predetermined wavelength using a non-scanning light detector, as explained below.

Scanning light source 466 is generally configured to progressively scan light in the infrared or near infrared spectrum over at least a designated surface area portion of interactive display surface 464, which may be the entire interactive display surface or only a part thereof, if a plurality of scanning light sources 466 are employed to scan different portions of the interactive display surface.

In one exemplary implementation, scanning light source 466 is a raster scanning emitter light source with a collimated beam diameter to illuminate object feature sizes down to 4 mm. In this exemplary implementation, scanning light source 466 can instantaneously illuminate a portion of interactive display surface 464 that is approximately 152.times.114 pixels in size at a rate of about 60 times per second, for example. The skilled practitioner will recognize that scanning light source 466 can be configured for almost any illumination beam size depending on the specific requirements of the application, such as at the rate at which the interactive display surface must be scanned, the required intensity of the scanning light, and other considerations.

Scanning light source 466 is generally configured to illuminate objects adjacent to display surface 464, as illustrated by illumination beams 478a and 478b which illuminate hover and touch objects 476a and 476b, respectively. In one example (and with reference to interactive display surface 64 in FIG. 3), scanning light source 466 is configured to scan the interactive display surface along the x-axis at 31 kHz and along the y-axis at 60 Hz. Illumination of the interactive display surface with narrow beam illumination increases the brightness of the scanning light beam at the interactive display surface, while decreasing the light source power requirement, and significantly increases the signal-to-noise ratio the wavelength of light used for object detection. Clearly, such a system is considerably more immune to ambient light interference than a system that provides a continuous (i.e., non-scanned) illumination of the interactive display surface.

Light detector 468 can be any light detection device configured to detect light reflected from objects on or adjacent to interactive display surface 464, such as a linear, a point, and/or an area light detector. In one implementation, corresponding to the embodiment shown in FIG. 4B, an integral scanning light source and detector 490 includes a cantilevered vibrating detector configured to detect light from a region on the interactive display surface that is generally coincident with the current disposition of the scanning light beam produced by the integral scanning light source. This implementation is specifically illustrated by showing that the scanning light detector of integral scanning light source and detector 490 is receiving light reflected from the objects adjacent to the interactive display surface along the paths indicated by dash lines 480a and 480b. In one exemplary implementation the scanning light detector of integral scanning light source and detector 490 has a 700 kHz or greater operational bandwidth. Integral scanning light source and detector 490 generally uses the same scanning and imaging optics for both scanning illumination and scanning light detection. Scanning light sources and scanning light detectors suitable for use in the interactive display system are well known to those of ordinary skill in the art and need not be described herein in detail.

In operation, integral scanning light source and detector 490 illuminates a portion of display surface 464 while simultaneously detecting light reflected from an object on or adjacent to (i.e., to detect objects on or hovering above) display surface 464 substantially within the illuminated portion of the interactive display surface. In one example (which is not shown), multiple integral scanning light source and detector 490 devices are each configured to scan a different portion of interactive display surface 464. In this manner, the entire interactive display surface 464 can be rapidly scanned by the plurality of scanning light sources to enable high resolution object detection. In one implementation, the interactive display surface can be divided into a plurality of different adjacent surface portions, each of which is scanned by a different integrated scanning light source and detector 490. More specifically, one exemplary implementation includes nine integral scanning light source and detector 490 devices (not separately shown) that are each assigned a different illumination region corresponding to ⅑ of the total usable surface area of interactive display surface 464.

PC 20 can be configured to detect and/or determine characteristics of objects proximate to the interactive display surface based on light detected by integral scanning light source and detector 490 and if a plurality of integral scanning light source and detector 490 devices are employed, the PC can combine the signals from each of a plurality of scanning light detectors to carry out this function in regard to objects that may be proximate more than one of the illumination regions. Thus, interactive display table 460 can determine a size, a shape, an orientation, a trajectory, or one or more characteristics associated with the object, based upon parameters of the light reflected from the object, that has been provided by scanning one or more scanned regions of the interactive display surface with one or more integral scanning light source and detector 490 devices.

Figure 5A:
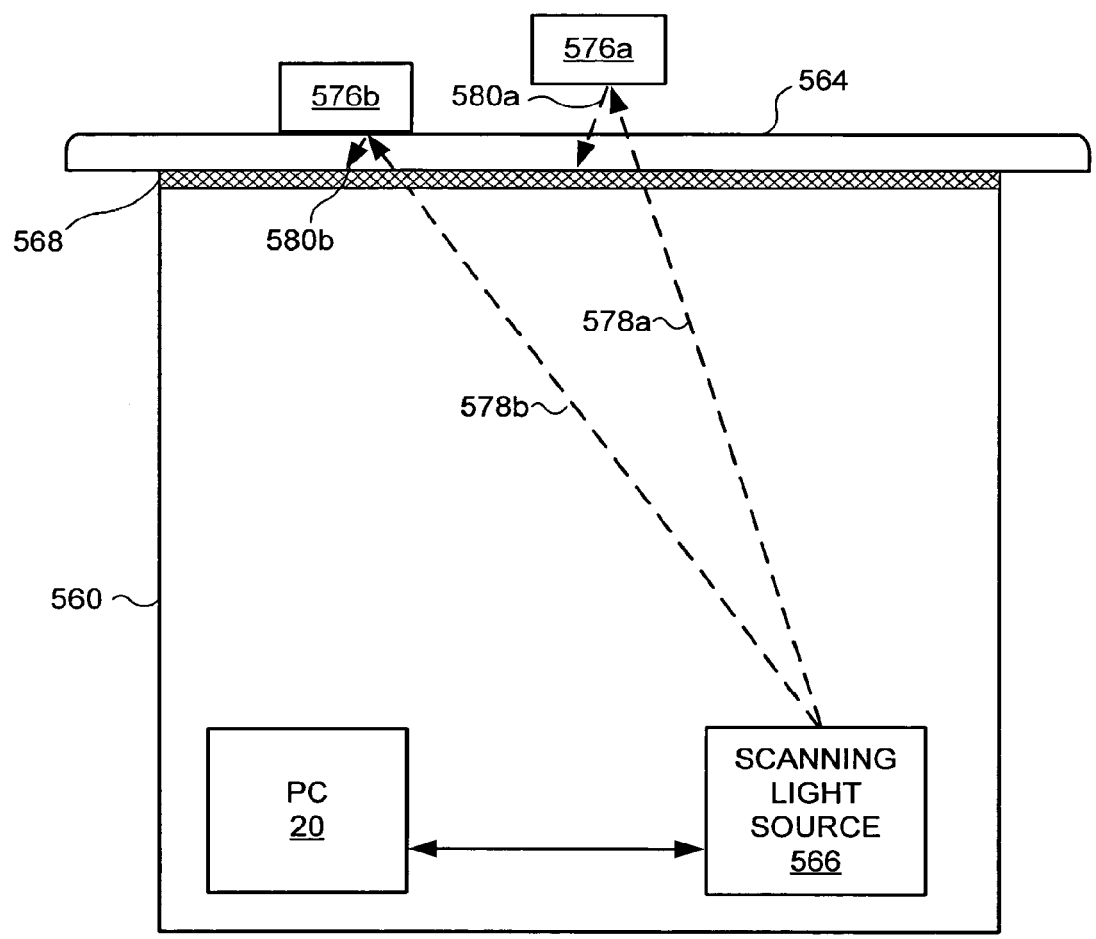
FIG. 5A is a schematic cross sectional illustration of an interactive display surface that includes a scanning light source and an array of photosensitive detectors adjacent to the interactive display surface.

Turning now to FIG. 5A, a schematic cross-sectional illustration of an interactive display 560 that includes a scanning light source 566 and photosensitive light surface 568 is depicted. The embodiment illustrated in FIG. 5A, shows an alternative light detection system that can be implemented for detecting light reflected from objects on (e.g., a touch object 576b) or adjacent to (e.g., a hover object 576a) an interactive display surface 564. Scanning light source 566 emits beams of light 578a and 578b, which are then reflected from objects 576a and 576b, respectively (e.g., reflection beams 580a and 580b) onto photosensitive light surface 568. Exemplary interactive display surface 564 can include a flat-panel display, such as an LCD or OLED array display. In this example, photosensitive light surface 568 transmits light emitted by scanning light source 566, but detects incident light reflected from objects proximate to interactive display surface 564. Photosensitive light surface 568 is generally positioned adjacent to display surface 564. As illustrated in the example shown in FIG. 5A, photosensitive light surface 568 can also be a light detecting layer affixed under interactive display surface 564 and may be formed integrally with the display surface.

Photosensitive light detector 568 is generally a planar array detector, comprising, for example, a phototransistor array or photodiode array. In some implementations, photosensitive light detector 568 is integral formed with the flat-panel display device during manufacture of the display. An integral display/detector device can readily transmit light in the infrared range that is incident on its lower surface but can detect light in the same wavelength range reflected from above the display, without affecting the quality of images displayed in the visible wavelength range. In this manner, IR light from scanning light source 566 is allowed to pass through light detector 568 in order to illuminate any objects proximate to interactive display surface 564. In operation, light emitted from scanning light source 566 and reflected from objects proximate to interactive display surface 564 will impinge upon light detector 568 causing a detection signal to be generated for input to PC 20. In other implementations, PC 20 can be configured to control scanning light source 566 in order to illuminate interactive display surface 564 and detect light reflected from objects proximate to the interactive display surface. As discussed above with reference to FIG. 4A scanning light source 566 can be implemented using one scanning light source, or a plurality of scanning light sources that is each configured to illuminate a different portion of interactive display surface 564 over a predetermined time interval in order to maximize illumination refresh rate and detection response resolution.

Figure 5B:
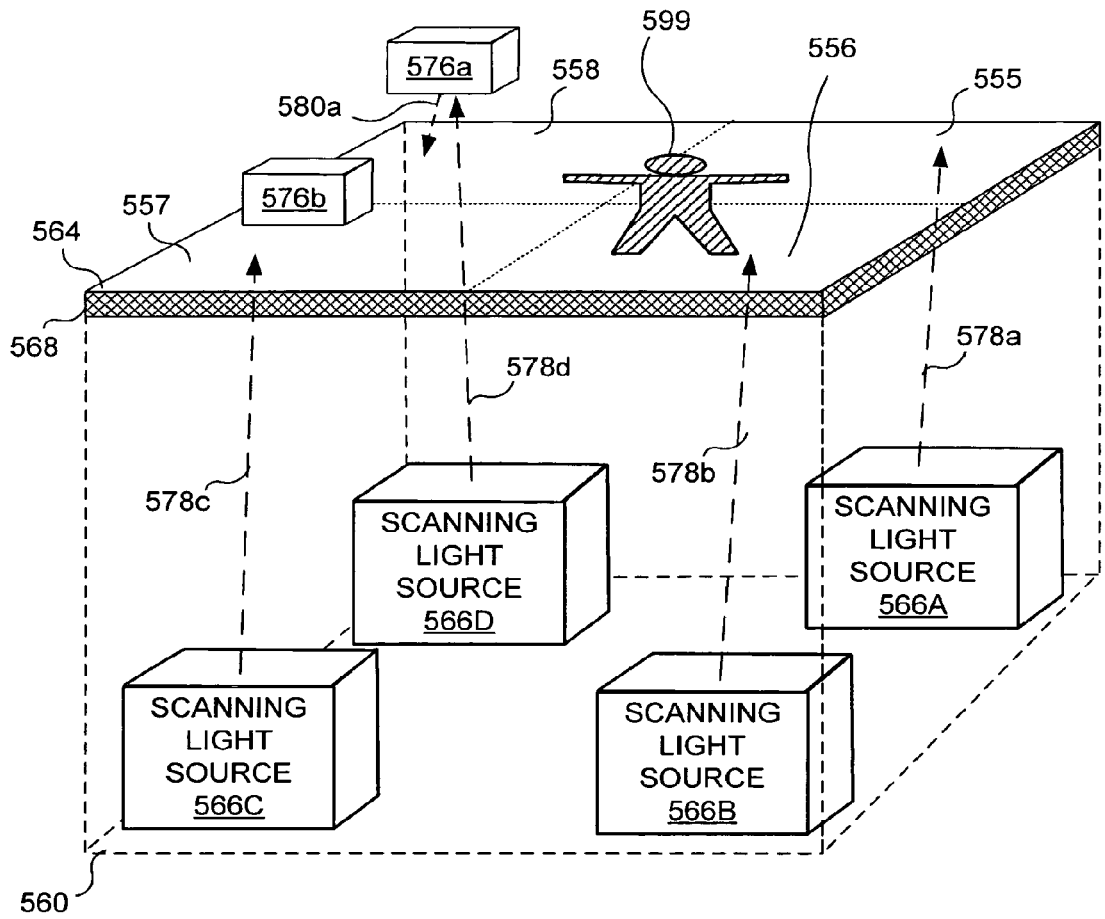
FIG. 5B is a schematic partial isometric view of an interactive display system that includes a plurality of scanning light sources configured for illuminating specific portions of the interactive surface, and an array of photosensitive detectors disposed adjacent to (or integral with) the interactive display surface.

FIG. 5B illustrates an embodiment in which four scanning light sources 566a-566d are configured to illuminate four different portions of the interactive display surface 564, i.e., portions 555, 556, 557, and 558. Each portion of the interactive display surface is illuminated with a different one of scanning light sources 566a-566d, as illustrated by rays 578a-578d, respectively. The scanning light sources illuminate any object that is proximate to display surface 564 and which is within the specific portion that the scanning light source is illuminating. For example, "touch" object 576b is touching portion 557 and is illuminated by scanning light source 566c. Hover object 576a is shown near portion 558 of interactive display surface 564 and is additionally shown reflecting the scanning illumination light back to light detector 568 (e.g., as a ray 580a). A skilled practitioner will recognize that each of the scanning light sources 566a-566d can be configured to illuminate the corresponding portions (e.g., any of portions 555, 556, 557, and 558) of interactive display surface 564 for object and user input detection while an image (e.g., an image 599) is concurrently displayed to a user on the interactive display surface.

Figure 5C:
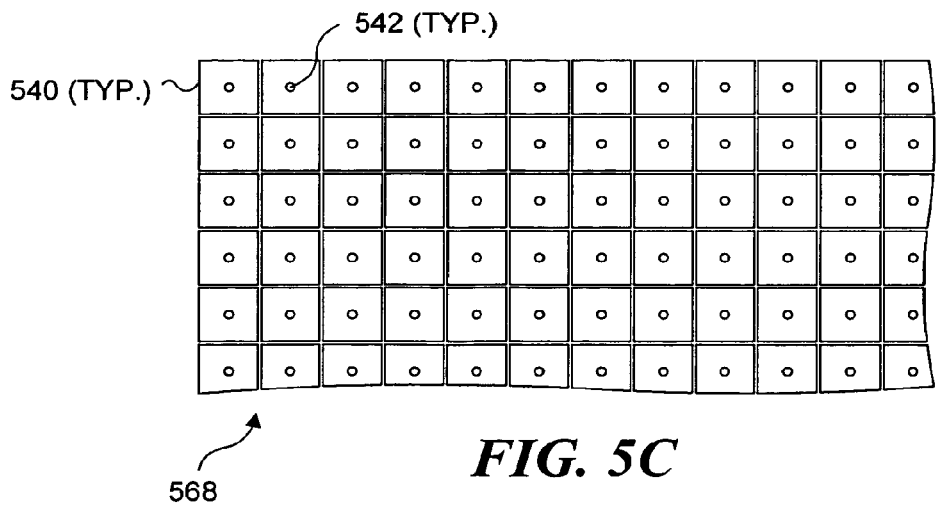
FIG. 5C is a schematic partial view of a flat panel display that includes an array of photosensitive detectors according to the example shown in FIG. 5B.

The example shown in FIG. 5B includes an integrated flat panel display and photosensitive array light detector 568, which is formed as a surface or layer, is illustrated in greater detail in FIG. 5C. A display element 540 (e.g., a pixel) typical of the array of such devices is illustrated in FIG. 5C as a component of integrated flat panel display and photosensitive array light detector 568. A light detector element 542, which is also typical of such devices in the array is schematically depicted in FIG. 5C. It will be understood that display element 540 can be a pixel, or a cluster of pixels, of an LCD or OLED panel. Light detector element 542 can be a single device or a cluster of phototransistors or photodiodes, for example. Although FIGS. 5A-5C illustrate integrated flat panel display and photosensitive array light detector 568, it should be understood that the alternative display and detectors types discussed with reference to FIGS. 2, 3, 4A, and 4B can also be employed with multiple scanning light sources configured to illuminate specific portions of a display surface as illustrated in FIG. 5B. In this case, the scanning light detectors would also be associated with a different portion of the interactive display surface and scan that portion with the scanning light source associated with that portion.

Figure 6:
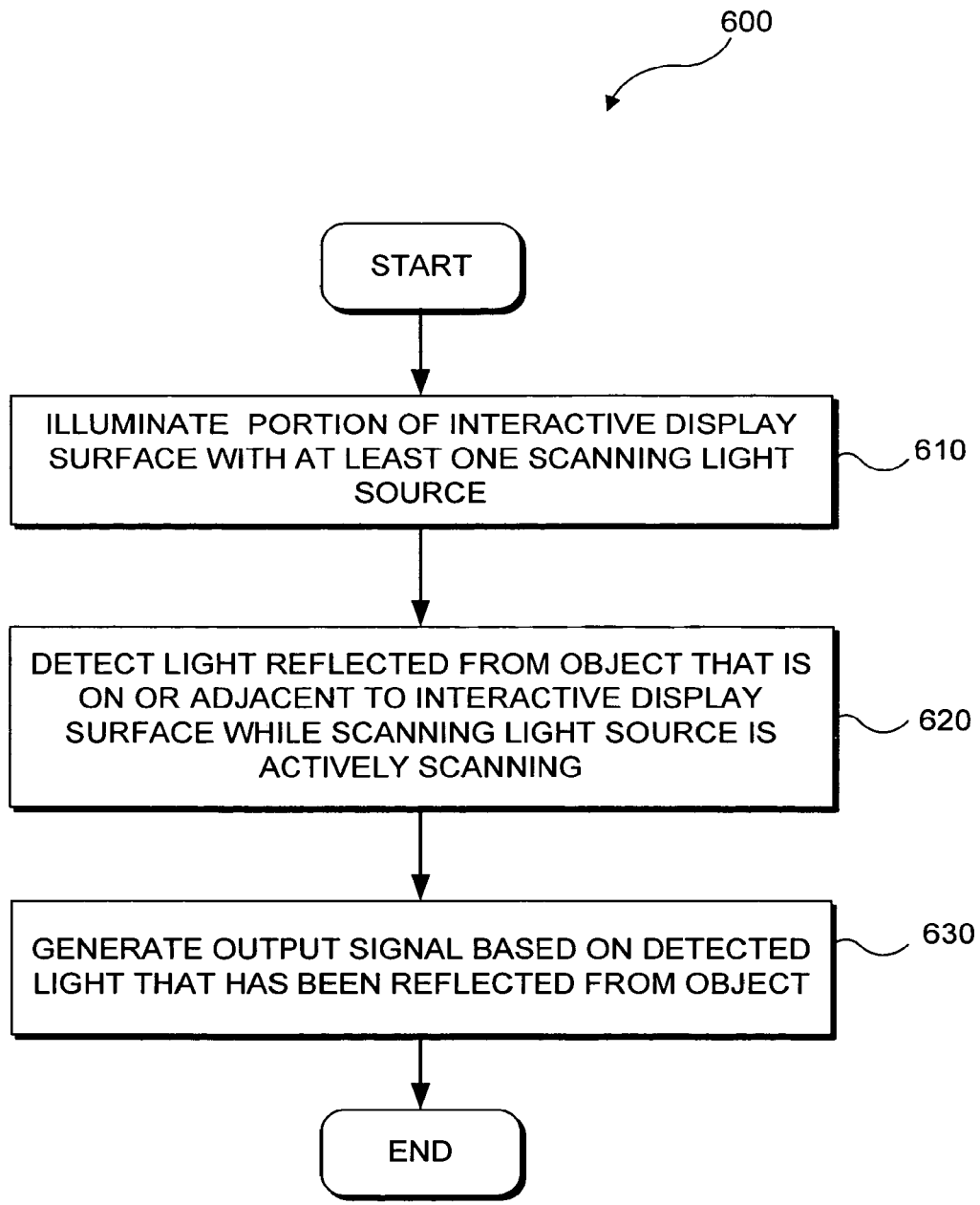
FIG. 6 is a flow diagram illustrating the steps of an exemplary method for detecting an object on or adjacent to an interactive display surface.

FIG. 6 is a flow diagram illustrating an exemplary method 600 for detecting an object on or adjacent to an interactive display surface. Method 600 can be implemented in some embodiments with components, devices, and techniques as discussed with reference to FIGS. 1-5. In some implementations, one or more steps of method 600 are embodied on a computer readable medium containing computer executable code or machine instructions such that a series of steps are implemented when the computer readable code is executed by a processor. In the following description, various steps of method 600 are described with respect to one or more computing system processors performing the method steps. In some implementations, certain steps of method 600 can be combined, performed simultaneously, or in a different order, without deviating from the objective of method 600 or without producing different results. Method 600 begins at a step 610.

In step 610, a portion of the interactive display surface is illuminated with the at least one scanning light source as it scans the interactive display surface. The scanning light source can illuminate the portion of the interactive display surface without regard to whether the interactive display surface is actively displaying a visible graphic and/or text image. In one implementation, each of a plurality of scanning light sources is configured to illuminate a specific different portion of an interactive display surface, such that the entire interactive display surface is illuminated over a predetermined time interval by the plurality of the scanning light sources.

In a step 620, light from the scanning light source, which is reflected from an object that is proximate to the interactive display surface, is detected with the light detector while the scanning light source is illuminating the portion of the interactive display surface. The light can be detected while the scanning light sources are illuminating the portion of the interactive display surface. In one implementation, the light is detected with a scanning light detector configured to scan with the scanning light source so that the portion of the interactive display surface being scanning by the scanning light source is also being scanned in synchronization by the scanning light detector. The scanning light source and scanning light detector can be integral so that they scan together, or can synchronized to scan the same general regions of the interactive display surface. In another implementation, the light detector is not a scanning light detector, but an area light detector, which simply detects the light reflected from an object that is touching or hovering above the interactive display surface.

In a step 630, an output signal is generated by the light detector in response to the detected light that is reflected from an object that is on or adjacent to the interactive display surface and which is received by the light detector. In one implementation, the output signal is processed by a computing system that is coupled to the light detector and can be applied to detect or to determine characteristics of one or more objects proximate to the interactive display surface. In one example, the output signal can be applied to determine user input based upon the disposition of the object(s) or based upon characteristics of the one or more objects detected proximate to the interactive display surface.

Figure 7:
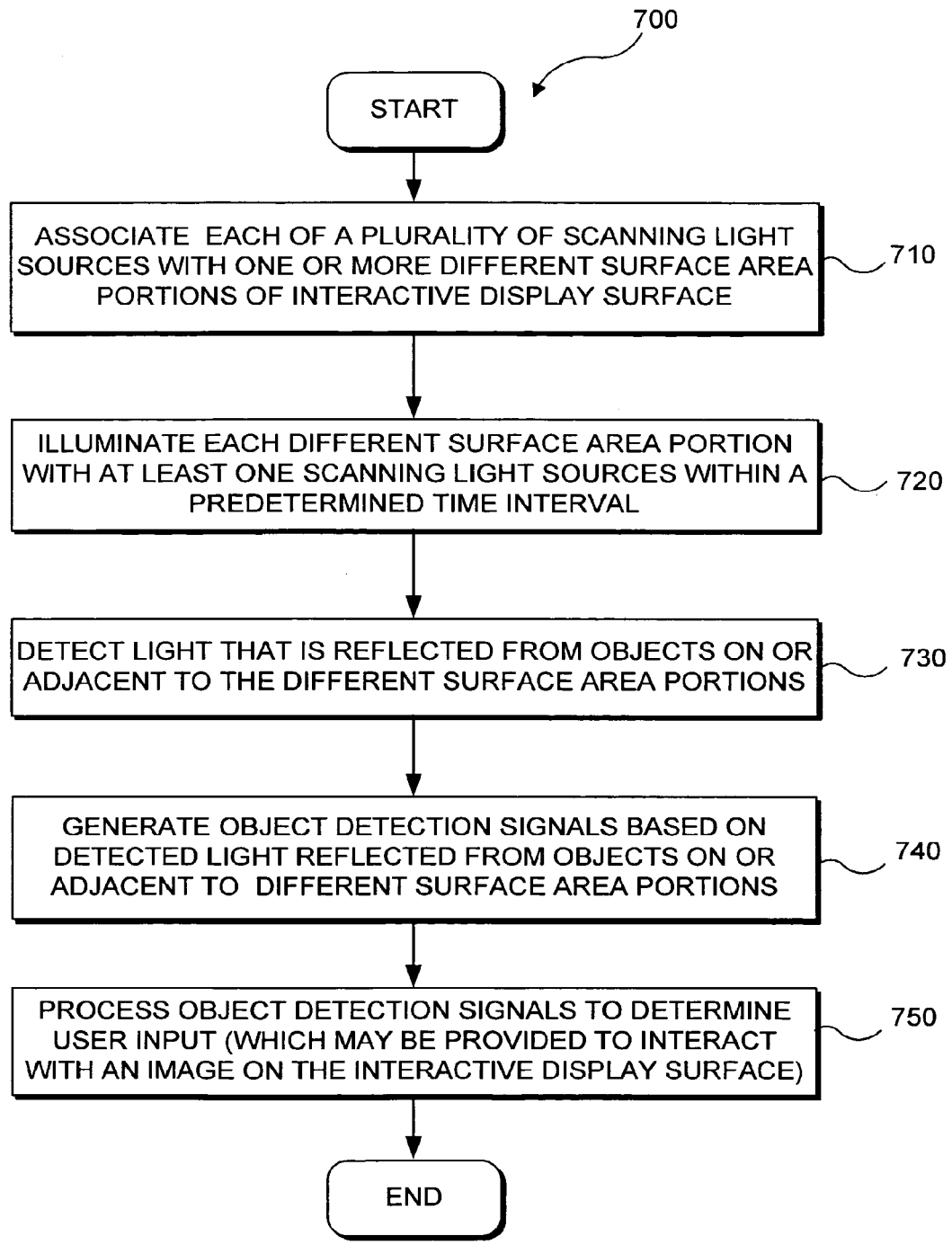
FIG. 7 is another flow diagram illustrating the steps of an exemplary method for receiving user input to an interactive display system that is configured to detect objects on or adjacent to an interactive display surface.

FIG. 7 is another flow diagram illustrating the logical steps of an exemplary method for receiving user input to an interactive display system that is configured to detect objects proximate to an interactive display surface. Method 700 can be implemented in some embodiments with components, devices, and techniques as discussed with reference to FIGS. 1-5. In some implementations, one or more steps of method 700 can be embodied on a computer readable medium containing computer executable code or machine instructions such that a series of steps are implemented when the computer readable code is executed by a processor. In the following description, various steps of method 600 are described with respect to one or more computing system processors performing the method steps. In some implementations, certain steps of method 700 can be combined, performed simultaneously, or in a different order, without deviating from the objective of method 700 or without producing different results. Method 700 begins at a step 710.

In step 710, each of a plurality of scanning light sources is associated with one or more of a plurality of different surface area portions of the interactive display surface. In one implementation, the combination of the different surface area portions taken together substantially equal the total area of the interactive display surface employed for user input. Each of the plurality of scanning light sources is associated with the different specific portion of the interactive display surface that it will illuminate.

In a step 720, each of the different surface area portions of the interactive display surface is illuminated with at least one of the plurality of scanning light sources within a predetermined time interval. In one implementation the predetermined time interval is determined based upon the total number of surface area portions and the total number of scanning light sources in order to minimize a time required to illuminate the entire interactive display surface.

In a step 730, light that is reflected from one or more objects that are on or adjacent to at least one of the different surface area portions is detected. In one implementation, at least one of the plurality of scanning light sources provides a source for the light that is reflected when the scanning light source is providing the illumination. In one implementation, the light reflected from an object is detected with a scanning light detector. In another implementation the light is detected with a light detector that is not scanned, e.g., an array of light detectors that is positioned adjacent to the interactive display surface.

In a step 740, a plurality of object detection signals is generated based on the light reflected from one or more objects that is detected in step 730. In another implementation the plurality of light detection signals that are generated are input to a computing system that is in communication with the light detector.

In a step 750, the plurality of object detection signals is processed to determine the user input. In one implementation, the user input is associated with light reflected from one or more objects that are proximate to the interactive display surface. For example, an object can have specific light reflecting characteristics that can be interpreted as a user input, or an object can have a light reflective/absorptive code upon its surface, such as an optical barcode, that provide a user input when place proximate to the interactive display surface by a user.

Another implementation includes the steps of displaying an image on the interactive display surface while performing at least one of the steps of method 700 and then applying the user input to interact with the displayed image.

Although the present invention has been described in connection with the preferred form of practicing it and modifications thereto, those of ordinary skill in the art will understand that many other modifications can be made to the present invention within the scope of the claims that follow. Accordingly, it is not intended that the scope of the invention in any way be limited by the above description, but instead be determined entirely by reference to the claims that follow.

The invention claimed is:

1. A method for detecting an object or user input provided with an object using a scanning light source, comprising the steps of: illuminating an interactive display surface with at least one scanning light source, wherein the interactive display surface has an external surface and an internal surface, wherein the at least one scanning light source is configured to emit light of a predetermined wavelength and scan interactive display surface with the light of the predetermined wavelength, so that the entire interactive display surface is fully scanned over time, and wherein illuminating the interactive display surface includes the at least one scanning light source emitting the light through a photosensitive light surface toward the interactive display surface; and detecting light of the predetermined wavelength that is reflected from an object that is on or proximate the external surface of the interactive display surface, the light that is reflected being detected as the at least one scanning light source is illuminating the object with the light of the predetermined wavelength, and wherein the photosensitive light surface acts as a detector for the predetermined wavelength reflected from the object.

2. The method recited in claim 1, wherein each of the at least one scanning light source is configured to emit light radiation of the predetermined wavelength in the infra-red spectrum.

3. The method recited in claim 1, wherein the photosensitive light surface is adjacent the internal surface of the interactive display surface.

4. The method recited in claim 1, wherein the photosensitive light surface is the only light detector used in detecting light of the predetermined wavelength.

5. The method recited in claim 1, further comprising: combining an output from detecting light of the predetermined wavelength in regions corresponding to each of the at least one scanning light source, such that a composite output is provided for the entire interactive display surface.

6. The method recited in claim 1, wherein illuminating the interactive display surface comprises using at least one scanning light source having a spatially small-sized cross-sectional beam concentrated in a small area rather than over a wide area.

7. The method recited in claim 1, wherein illuminating the interactive display surface comprises a detector configured to detect light of the predetermined wavelength that is reflected from the object.

8. The method recited in claim 1, wherein at least one scanning light source comprises a raster scanning emitter light source with a collimated beam diameter.

9. At least one computer-readable storage device having stored thereon computer executable instructions that, when executed by one or more processors associated with an interactive display table, cause the interactive display table to detect an object or user input provided with an object using a scanning light source by performing at least: illuminating an interactive display surface with at least one scanning light source, wherein the interactive display surface has an external surface and an internal surface, wherein the at least one scanning light source is configured to emit light of a predetermined wavelength and scan interactive display surface with the light of the predetermined wavelength, so that the entire interactive display surface is fully scanned over time, and wherein illuminating the interactive display surface includes the at least one scanning light source emitting the light through a photosensitive light surface toward the interactive display surface; and detecting light of the predetermined wavelength that is reflected from an object that is on or proximate the external surface of the interactive display surface, the light that is reflected being detected as the at least one scanning light source is illuminating the object with the light of the predetermined wavelength, and wherein the photosensitive light surface acts as a detector for the predetermined wavelength reflected from the object.

10. The at least one computer-readable storage device recited in claim 9, wherein each of the at least one scanning light source is configured to emit light radiation of the predetermined wavelength in the infra-red spectrum.

11. The at least one computer-readable storage device recited in claim 9, wherein the photosensitive light surface is adjacent the internal surface of the interactive display surface.

12. The at least one computer-readable storage device recited in claim 9, wherein the photosensitive light surface is the only light detector used in detecting light of the predetermined wavelength.

13. The at least one computer-readable storage device recited in claim 9, wherein the interactive display table is further caused to perform: combining an output from detecting light of the predetermined wavelength in regions corresponding to each of the at least one scanning light source, such that a composite output is provided for the entire interactive display surface.

14. The at least one computer-readable storage device recited in claim 9, wherein illuminating the interactive display surface comprises using at least one scanning light source having a spatially small-sized cross-sectional beam concentrated in a small area rather than over a wide area.

15. The at least one computer-readable storage device recited in claim 9, wherein illuminating the interactive display surface comprises a detector configured to detect light of the predetermined wavelength that is reflected from the object.

16. The at least one computer-readable storage device recited in claim 9, wherein at least one scanning light source comprises a raster scanning emitter light source with a collimated beam diameter.

17. An interactive display table for detecting an object on or adjacent to a user interface surface, comprising: an interactive display surface having an internal surface and an external surface; at least one scanning light source, each of the at least one scanning light source being configured for emitting light of a predetermined wavelength to thereby scan the interactive display surface with the light of the predetermined wavelength, so that the entire interactive display surface is fully scanned at least over time; and at least one photosensitive light surface arranged to receive light emitted from the at least one scanning light source as directed to the interactive display surface, and to detect light reflected back from the interactive display surface and/or an object on or near the interactive display surface, the at least one photosensitive light surface comprising a detector for the predetermined wavelength of reflected light.

18. The interactive display table recited in claim 17, wherein the at least one photosensitive light surface is adjacent the internal surface of the interactive display surface.

19. The interactive display table of claim 17, wherein the at least one photosensitive layer is a photo transistor array.

20. The interactive display table of claim 17, further comprising a computing system configured to receive an output from the detector and detect each of:

a type of specific object that is adjacent to or in contact with the interactive display surface based on a characteristic of the object determined from light reflected by the object;
a size of the specific object;
a shape of the specific object;
a trajectory of the specific object over time;
an orientation of the specific object; and
a characteristic associated with the specific object based upon parameters of the light reflected from the specific object.

* * * * *